US012516120B2

(12) United States Patent
Roy et al.

(10) Patent No.: US 12,516,120 B2
(45) Date of Patent: Jan. 6, 2026

(54) METHODS AND SYSTEMS FOR T CELL EXPANSION

(71) Applicant: Georgia Tech Research Corporation, Atlanta, GA (US)

(72) Inventors: Krishnendu Roy, Atlanta, GA (US); Nate Dwarshuis, Atlanta, GA (US); Ranjna Madan-Lala, Atlanta, GA (US); Kyung-Ho Roh, Atlanta, GA (US); Hannah Kathryn Wilson, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 147 days.

(21) Appl. No.: 18/108,869

(22) Filed: Feb. 13, 2023

(65) Prior Publication Data
US 2023/0293582 A1    Sep. 21, 2023

Related U.S. Application Data

(63) Continuation of application No. 16/343,869, filed as application No. PCT/US2017/057687 on Oct. 20, 2017, now abandoned.

(60) Provisional application No. 62/410,877, filed on Oct. 21, 2016.

(51) Int. Cl.
*A61K 40/11* (2025.01)
*A61K 38/20* (2006.01)
*A61K 40/31* (2025.01)
*A61K 40/42* (2025.01)
*C07K 16/28* (2006.01)
*C12M 1/40* (2006.01)
*C12M 3/06* (2006.01)
*C12N 15/86* (2006.01)

(52) U.S. Cl.
CPC .......... *C07K 16/2809* (2013.01); *A61K 38/20* (2013.01); *A61K 40/11* (2025.01); *A61K 40/31* (2025.01); *A61K 40/4211* (2025.01); *C07K 16/2818* (2013.01); *C12M 21/18* (2013.01); *C12M 27/14* (2013.01); *C12N 15/86* (2013.01); *A61K 2239/48* (2023.05)

(58) Field of Classification Search
CPC ... A61K 40/11; C07K 16/2809; C12M 21/18; C12M 27/00
See application file for complete search history.

(56) References Cited

U.S. PATENT DOCUMENTS

| | | |
|---|---|---|
| 7,790,456 B2 | 9/2010 | Terstegge |
| 2002/0019048 A1 | 2/2002 | Berenson et al. |
| 2008/0166328 A1 | 7/2008 | Harmon et al. |
| 2012/0219531 A1 | 8/2012 | Oh et al. |
| 2013/0164269 A1 | 6/2013 | Campbell et al. |
| 2013/0189723 A1* | 7/2013 | Felder et al. ........ C12N 5/0075 435/29 |
| 2015/0050730 A1 | 2/2015 | Cabral et al. |
| 2015/0166950 A1 | 6/2015 | Nelson |
| 2016/0008399 A1 | 1/2016 | Stephan |

FOREIGN PATENT DOCUMENTS

| | | |
|---|---|---|
| CN | 106085957 A | 11/2016 |
| WO | 0189539 A2 | 11/2001 |
| WO | 2005010162 A2 | 2/2005 |
| WO | 2007108835 A2 | 9/2007 |
| WO | 2010107392 A1 | 9/2010 |
| WO | WO2015164745 A1 * | 10/2015 ............. A61K 35/17 |
| WO | WO2017035577 A1 * | 3/2017 ............ C12N 5/0783 |

OTHER PUBLICATIONS

Koh et al. (2020) "Three dimensional microcarrier system in mesenchymal stem cell culture: a systematic review" Cell & Bioscience, 10, 1-16. (Year: 2020).*
Dwarshuis et al. (2019) "Functionalized microcarriers improve T cell manufacturing by facilitating migratory memory T cell production and increasing CD4/CD8 ratio" bioRxiv 646760, 25 pages. (Year: 2019).*
Vera et al. (2010) "Accelerated production of antigen-specific T cells for preclinical and clinical applications using gas-permeable rapid expansion cultureware (G-Rex)" Journal of Immunotherapy, 33(3), 305-315. (Year: 2010).
Motloung MP, Ojijo V, Bandyopadhyay J, Ray SS. Cellulose Nanostructure-Based Biodegradable Nanocomposite Foams: A Brief Overview on the Recent Advancements and Perspectives. Polymers (Basel). Jul. 31, 2019;11(8):1270 (Year: 2019).
Annabi N, Nichol JW, Zhong X, Ji C, Koshy S, Khademhosseini A, Dehghani F. Controlling the porosity and microarchitecture of hydrogels for tissue engineering. Tissue Engineering Part B: Reviews. Aug. 1, 2010;16(4):371-83 (Year: 2010).
Van Tomme SR, Hennink WE. Biodegradable dextran hydrogels for protein delivery applications. Expert Review of Medical Devices. Mar. 1, 2007;4(2):147-64 (Year: 2007).
Ng KW, Kugler LE, Doty SB, Ateshian GA, Hung CT. Scaffold degradation elevates the collagen content and dynamic compressive modulus in engineered articular cartilage. Osteoarthritis and cartilage. Feb. 1, 2009;17(2):220-7 (Year: 2009).
Wang X, Riviere I. Manufacture of tumor-and virus-specific T lymphocytes for adoptive cell therapies. Cancer gene therapy. Feb. 2015;22(2) :85-94. (Year: 2015).
Alberts B, Johnson A, Lewis J, Raff M, Roberts K, Walter P. B cells and antibodies. InMolecular Biology of the Cell. 4th edition 2002. Garland Science. Chapter 24 "B Cells and Antibodies" (Year: 2002).
Pettersson S. Biodegradable gelatin microcarriers in tissue engineering: In vitro studies on cartilage and bone (Doctoral dissertation, Linkoping University Electronic Press). (Year: 2009).

(Continued)

*Primary Examiner* — James Joseph Graber
(74) *Attorney, Agent, or Firm* — Meunier Carlin & Curfman LLC

(57) ABSTRACT

The present disclosure provides a system for mimicking the secondary lymphoid organs where suspension cells (e.g., T cells) are expanded; methods el expanding activating, and transfecting the suspension cells in the synthetic, microenvironment, and suspension cells produced by such systems and methods.

21 Claims, 9 Drawing Sheets

(56) References Cited

OTHER PUBLICATIONS

Wang X, Riviere I. Manufacture of tumor-and virus-specific T lymphocyles for adoptive cell therapies. Cancer gene therapy. Feb. 2015;22(2):85-94. (Year: 2015).

Badenes SM, Fernandes TG, Rodrigues CA, Diogo MM, Cabral JM. Microcarrier-based platforms for in vitro expansion and differentiation of human pluripotent stem cells in bioreactor culture systems. Journal of biotechnology. Sep. 20, 2016;234:71-82. (Year: 2016).

Martin Y, Eldardiri M, Lawrence-Watt DJ, Sharpe JR. Microcarriers and their potential in tissue regeneration. Tissue Engineering Part B: Reviews. Feb. 1, 2011;17(1):71-80. (Year: 2011).

Park JH, Perez RA, Jin GZ, Choi SJ, Kim HW, Wall IB. Microcarriers designed for cell culture and tissue engineering of bone. Tissue Engineering Part B: Reviews. Apr. 1, 2013;19(2):172-90. (Year: 2013).

Somerville RP, Dudley ME. Bioreactors get personal. Oncoimmunology. Nov. 1, 2012;1(8):1435-7. (Year: 2012).

Vera JF, Brenner LJ, Gerdemann U, et al. Accelerated production of antigen-specific T-cells for pre-clinical and clinical applications using Gas-permeable Rapid Expansion cultureware (G-Rex). Journal of immunotherapy (Hagerstown, Md.: 1997). Apr. 2010;33(3): 305 (Year: 2010).

International Search Report and Written Opinion from application No. PCT/US2017/057687 mailed Jan. 19, 2018 15 pages.

Roh et al., "Engineering Approaches for Regeneration of T Lymphopoiesis," Jun. 29, 2016, Biomaterials Research, vol. 20, No. 20.

Extended European Search Report issued for Application No. EP17862994.5, dated Apr. 15, 2020. 9 pages.

Office Action issued for U.S. Appl. No. 16/343,869, dated May 7, 2021.

Office Action issued for U.S. Appl. No. 16/343,869, dated Nov. 16, 2021.

Office Action issued for U.S. Appl. No. 16/343,869, dated Jun. 14, 2022.

Office Action issued for U.S. Appl. No. 16/343,869, dated Jan. 3, 2023.

* cited by examiner

Uncoated

Coated

METHODS AND SYSTEMS FOR T CELL EXPANSION

CROSS-REFERENCE TO RELATED APPLICATIONS

This application claims priority to U.S. patent application Ser. No. 16/343,869, filed on Apr. 22, 2019, which is a National Stage Entry of PCT/US17/57687, filed Oct. 20, 2017, which claims priority to U.S. Provisional Application No. 62/410,877, filed on 21 Oct. 2016, the disclosure of which is all of which are herein incorporated by reference in its their entirety.

GOVERNMENT SPONSORSHIP

This invention was made with government support under Grant Nos. 12567G5 and 1547638 awarded by the National Science Foundation. The government has certain rights in the invention.

BACKGROUND OF THE DISCLOSURE

Field

Embodiments of the, present disclosure relate generally to methods and systems for suspension cell (far example and not limitation, T cells) expansion, and more specifically to synthetic microenvironments capable of mimicking T cell niches within secondary lymphoid organs (such as for example and not limitation, lymph nodes). For example and not limitation, these synthetic microenvironments comprise functionalized macroporous three-dimensional (3D) microcarriers that contain antibodies to enhance T cell expansion and activation, as well as optionally enable transfection. T cells obtainable by these systems and methods include gamma delta T cells as well as alpha-beta T cells, including for example and not limitation, recombinant T cells, gene modified T cells, chimeric antigen receptor (CAR) T cells, unmodified T cells, and $CCR7^+CD62^+$ central memory T cells.

Background

Immunotherapy using adoptive T cell transfer (ACT) is a highly promising approach in treating cancers, infectious and autoimmune diseases, as well as for transplantation associated problems. In particular, anti-tumor ACT, using tumor-isolated or genetically-engineered T cells (e.g., Chimeric Antigen Receptor (CAR) T cells), has shown great potential in clinical trials of various cancers (1 -3).

Physiological T cell expansion occurs primarily in secondary lymphoid organs (e.g., lymph nodes (LNs), spleen, gut-associated lymphoid tissue etc.). Upon interaction with antigen presenting cells (APC, such as for example and not limitation, dendritic cells) displaying foreign antigen epitopes, T cells engage with APCs through several surface molecules including T cell receptors (TCRs), CD3, CD28, etc. T cells expand as a result of this direct signaling aided by a set of locally secreted cytokines by themselves and APCs. The high cell density of the T cell zone in LNs ensures that cytokines are presented at high local concentrations and efficient autocrine and paracrine signaling takes place. Current T cell expansion methods using suspension cultures, is therefore non-physiological and requires very high dosage of cytokines and do not recapitulate the cell-cell communication required for efficient T cell expansion. Even though T cells do form loose aggregates in these suspension cultures, synthetic 3D niches that mimic a more LN like high-density culture environment with efficient cell-cell communication and relevant extracellular-matrix, could significantly improve I cell expansion and quality.

Currently, the most common approach to T cell expansion is the use of soluble anti-CD3 or anti-CD3/anti-CD28 dynabeads with suspension cultures. Although surface-immobilized antibodies (Abs), such as on microbeads, signal more robustly and mimic the APC/T-cell interactions better, a key issue with bead-based expansion is that newly generated cells (progenies) have minimal interaction with anti-CD3/anti-CD28 beads and thus do not expand further.

In adults, each dose of CAR-I cell therapy requires approximately $10^8$-$10^9$ cells to be injected (4-6). Considering the additional number of cells that are required for safety testing and quality control testing of sterility, endotoxin level, cell purity, particulate impurity, stability, potency, etc.), the total number of cells for each batch of production must exceed $\sim 10^9$, Unfortunately, the number of autologous cells that can be harvested from cancer patients, especially those with advanced cancer and those undergoing radiation and chemotherapy could be very limited, which further decreases significantly in the process of genetic-modification (CAR transduction with lentivirus). Current expansion protocols using suspension cultures with large amounts of IL-2, IL-7 or IL-15 can only achieve ~10-100-fold expansion in 1-2 weeks of processing, thus generally resulting in just over a single dose of T cells from each batch with no option of multiple dosing or storage. If multiple doses arc to be administered from a single bioprocess, even more cells would be necessary (especially given inefficient freeze-thaw process). Furthermore, the transduction/expansion process generally results in a heterogeneous population of T cells with multiple phenotypes (effector cells, memory cells, exhausted cells, high or low cytokine-secreting cells etc.) and which of these phenotypes are most suited for maximal in vivo anti-tumor efficacy, is still largely unknown. Although for B cell malignancies, memory-type T cells ($CD62L^+CCR7^+$) have been shown to have the highest correlative potency, primarily due to their ability to survive in vivo and better home into the tumor site (lymph nodes); that has not been established for other cancers (7). Thus, new bioprocess engineering methods to efficiently expand CAR-T populations, in trans of numbers, cell quality and potency, is critically needed to enable broad clinical use of this promising therapy.

Thus, despite its potential and recent success, current approaches for CAR-based ACT are severely constrained by (a) the limited availability of autologous T cells from cancer patients; (b) difficulty in robustly and reproducibly expanding these cells to enough numbers for multiple administrations; and (c) lack of methods that selectively expand the most potent sub-population of T cells for specific applications (for example but not limitation, memory T cells and/or T cells with superior transport properties). As a result, new cell-manufacturing concepts that would allow large scale production of therapeutic T cells, such as for example and not limitation, therapeutic CAR-T cells, without losing their potency and safety, are needed.

What is needed, therefore, is a synthetic microenvironment capable of mimicking cell niches within secondary lymphoid organs such as for example and not limitation, lymph nodes, the anatomical location where natural T cell activation and expansion take place in the body. The systems should take advantage of 3D microcarriers—which are widely used for adherent cells in industry practice but not for suspension cells—that can be functionalized with antibodies to promote suspension cell (e.g., cell) activation and expansion. The systems should provide suspension cells with improved potency and efficacy and allow for specific highly potent sub populations to expand selectively. It is to such systems and methods of producing suspension cells, such as for example and not limitation, T cells, that embodiments of the present disclosure are directed.

BRIEF SUMMARY OF THE DISCLOSURE

As specified in the Background Section, there is a great need in the art to identify technologies for improved methods and systems for large-scale production of suspension cells, such as far example and not limitation, cells, and use this understanding to develop novel bioreactor systems and methods. The present disclosure satisfies this and other needs. Embodiments of the present disclosure relate generally to synthetic microenvironment capable of mimicking T cell niches within secondary lymphoid organs (such as for example and not limitation, lymph nodes) and More specifically to macroporous 3D microcarriers that can be functionalized with antibodies to promote suspension cell (e.g., T cell) activation and expansion to mimic the environment found in lymph nodes. The system should provide suspension cells with improved potency and efficacy. It is to such systems and methods of producing suspension cells, such as for example and not limitation, T cells, that embodiments of the present disclosure are directed. T cells produced by the systems and methods described herein include, but are not limited to, recombinant T cells, gene modified T cells, chimeric antigen receptor (CAR) T unmodified T cells, and $CCR7^+CD62^+$ central memory T cells.

The present disclosure provides a system for mimicking the secondary lymphoid organs where suspension cells T cells) are expanded; methods of expanding, activating, and transfecting the suspension cells in the synthetic microenvironment, and suspension cells produced by such systems and methods.

In one aspect, the disclosure provides a system for expanding, activating, and/or transfecting suspension cells comprising: a porous microcarrier; and the suspension cells.

In some embodiments, the suspension cells are isolated from a patient's blood or organs, including both normal and/or diseased tissues.

In some embodiments, the suspension cells are T cells.

In other embodiments, the porous microcarrier is three dimensional. In some embodiments, the porous microcarrier comprises proteins, carbohydrates, lipids or nucleic acids. In some embodiments, the porous microcarrier comprises gelatin or other extracellular matrix components.

In yet other embodiments, the porous microcarrier is functionalized. In some embodiments, the functionalized porous microcarrier comprises at least one of antibodies, aptamers, and phage-display identified peptide ligands.

In some embodiments, the antibodies comprise antibodies that are specific for the suspension cells. In other embodiments, the antibodies comprise antibodies that are specific for T cells. In some embodiments, the antibodies comprise anti-CD2, anti-CD3 and/or anti-CD28 antibodies.

In an embodiment, the system in any of the preceding embodiments further comprises a bioreactor. In some embodiments, the bioreactor comprises a closed bioreactor and an open bioreactor. In some embodiments, the open bioreactor comprises a static culture vessel with a gas-permeable bottom. In other embodiments, the closed bioreactor comprises a stirred-type bioreactor, a bag bioreactor, and a perfusion bioreactor.

In another embodiment, the system in any of the preceding embodiments further comprises at least one of culture medium, at least one cytokine, and/or at least one viral vector, and optionally at least one growth factor.

In some embodiments, the at least one cytokine comprises IL2 and optionally at least one of IL8 or IL15. In other embodiments, the at least one viral -vector is configured for use in gene therapy (such as for example and not limitation, a lentiviral vector, a retroviral vector, an adenoviral vector, and an adeno-associated viral vector).

In any of the embodiments described herein, the suspension cells can comprise recombinant T cells, gene modified T cells, chimeric antigen receptor (CAR) T cells, unmodified T cells, and/or $CCR^+CD62^+$ central memory T cells.

In some embodiments, the at least one viral vector comprises a CAR transgene and optionally at least one additional gene, wherein the at least one additional gene comprises therapeutic genes, surface marker genes, reporter genes, suicide genes, chemokine receptor genes, cytokine-expressing genes, and/or hymn-me-checkpoint receptor genes.

In any of the preceding embodiments, the porous microcarrier is macroporous. In some embodiments, the porous microcarrier is degradable, such as for example and not limitation, biodegradable.

In a related aspect, the disclosure provides a method of expanding, activating, and/or transfecting suspension cells, the method comprising: obtaining a blood sample from a patient; isolating suspension cells from the blood sample; introducing the suspension cells to a bioreactor comprising a porous microcarrier; activating the suspension cells; expanding the suspension cells; optionally transfecting the suspension cells; preparing the suspension cells for transfusion into the patient; and transfusing the suspension cells into the patient.

In some embodiments, the blood or tissue sample is obtained by leukapharesis.

In other embodiments, the suspension cells are T cells.

In some embodiments, the step of isolating suspension cells from the blood sample further comprises bead separation or magnetic bead separation.

In other embodiments, the bioreactor comprises a closed bioreactor and an open bioreactor. In some embodiments, the closed bioreactor comprises a stirred-type bioreactor, a bag bioreactor, and a perfusion bioreactor. In other embodiments, the open bioreactor comprises a static culture vessel with a gas-permeable bottom.

In some embodiments, the porous microcarrier is three dimensional. In other embodiments, the porous microcarrier comprises proteins, carbohydrates, lipids or nucleic acids. In still other embodiments, the porous microcarrier comprises gelatin or other extracellular matrix components.

In some embodiments, the porous microcarrier is functionalized. In other embodiments, the functionalized porous microcarrier comprises at least one of antibodies, aptamers, and phage-display identified peptide ligands. In still other embodiments, the antibodies comprise antibodies that are specific for the suspension cells. In seine embodiments, the antibodies comprise antibodies that are specific for cells. In some embodiments, the antibodies comprise anti-CD2, anti-CD3 and/or anti-CD28 antibodies.

In an embodiment of any of the foregoing methods, the method further comprises at least one of culture medium, at least one cytokine, and/or at least one viral vector, and optionally at least one growth factor. In some embodiments, the at least one cytokine Comprises IL2, and optionally at least one of IL7 or IL15.

In an embodiment of any of the foregoing methods, the activation step further comprises agitation, optionally under hypoxic conditions. In some embodiments, the agitation can be periodic or continuous. In other embodiments, the activation step can last for at least one day, at least two days, at least three days, and at least four days, and all ranges of time in between.

In an embodiment of any of the foregoing methods, the expansion step further comprises seed trains, optionally under hypoxic conditions. For example and not limitation, the expansion step can include increasing the size of the flask and/or bioreactor as the culture grows, which can also involve moving the expanding cells to a new vessel, and culture media exchanges every 2-3 days (particularly if a static culture). The expansion step can last for at least one day, at least two days, at least three days, at least four days, at least five days, at least six days, at least seven days, at least eight days, at least nine days, at least ten days, and at least eleven days, and all ranges of time in between.

In an embodiment of any of the foregoing methods, the optional transfection step further comprises adding at least one viral vector to the bioreactor comprising the suspension cells.

In an embodiment of any of the foregoing methods, the suspension cells comprise recombinant T cells, gene modified T cells, chimeric antigen receptor (CAR) T cells, unmodified T and/or $CCR7^+CD62^+$ central memory T cells.

In some embodiments, the at least one viral vector is configured for use in gene therapy. In other embodiments, the at least one viral vector comprises a CAR transgene and optionally at least eight additional gene, wherein the at least one additional gene comprises therapeutic genes, surface marker genes, reporter genes, suicide genes, chemokine receptor genes, cytokine-expressing genes, and/or immune-checkpoint receptor genes.

In an embodiment of any of the foregoing methods, the preparation step further comprises cell expansion and downstream bioprocessing. In some embodiments, the cell expansion and downstream bioprocessing comprises cell separation, purification, packaging, preservation, storage, shipping and transport, thawing, formulation, resuspension, and transfusion.

In an embodiment of any of the foregoing methods, the transfusion step further comprises injection, intravenous administration, and implantation (such as for example and not limitation, implantation of a sustained delivery device).

In an embodiment of any of the foregoing methods, the porous microcarrier is macroporous. In any of the preceding embodiments, the porous microcarrier is macroporous. Ira some embodiments, the porous microcarrier is degradable, such as for example and not limitation, biodegradable.

In a related aspect, the disclosure provides a T cell obtained from any of the systems disclosed herein.

In a related aspect, the disclosure provides a T cell obtained from any of the methods disclosed herein.

In one embodiment, the T cell is a memory cell. In another embodiment, the T cell is $CCR7^+CD62^+$ In another embodiment, the T cell is a central memory I cell. In yet another embodiment, the T eel is a CD4 T cell or a CD8 T cell. In some embodiments, the T cell comprises recombinant I cells, gene modified T chimeric antigen receptor (CAR) T cells, unmodified T cells, and/or $CCR7^+CD62^+$ central memory T cells.

In a related aspect, the disclosure provides a composition comprising at least one T cell as described herein. In some embodiments, the composition further comprises at least one carrier. In other embodiments, the composition is formulated for intravenous administration.

In a related aspect, the disclosure provides a pharmaceutical composition comprising at least one T cell as described herein. In some embodiments, the pharmaceutical composition further comprises at least one carrier. In other embodiments, the composition is formulated for intravenous administration. In some embodiments, the pharmaceutical composition further comprises at least one additional therapeutic agent.

In a related aspect, the disclosure provides the use of a composition (including a pharmaceutical composition) as described herein to treat a disease or condition in a patient in need thereof. In some embodiments, the disease or condition comprises genetic diseases, cancers, infections, autoimmune diseases, and/or transplant complications. In come embodiments, the use further comprises a second therapeutic method or agent, such as for example and not limitation, a cancer drug, an immunotherapeutic, an immunosuppressant, an autoimmune therapeutic agent, and/or a therapeutic for treating infections.

In a related aspect, the disclosure provides method of treating a disease or condition in a patient in need thereof, comprising administering a composition (including a pharmaceutical composition) as described herein to said patient. In some embodiments, the disease or condition comprises genetic diseases, cancers, infections, autoimmune diseases, and/or transplant complications. In some embodiments, the treatment further comprises a second therapeutic method or agent, such as for example and not limitation, a cancer drug, an immunotherapeutic, an immunosuppressant, an autoimmune therapeutic agent, and/or a therapeutic for treating infections.

In an embodiment of any of the foregoing systems, the porous microcarrier is configured tar activation, expansion, and/or transfection of the suspension cells.

In an embodiment of any of the foregoing methods, the porous microcarrier is configured tar activation; expansion, and/or transfection of the suspension cells.

These and other objects, features and advantages of the present disclosure will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below.

FIG. 1A) Streptavidin surface density as a function of sulfo-NHS-biotin added per mass of microcarrier for Cultispher S and Cultispher G microcarriers. FIG. 1B) Binding site density as a function of sulfo-NHS-biotin amount added per mass of Cultispher S (CuS) microcarriers.

(FIG. 4, Bottom) Day 14 fold change of microcarrier cultures at indicated ratios compared with cells grown in MACSibeads culture (conventional magnetic beads).

FIG. 6A) Expanded T cells assessed for CCR7 and CD62L populations using flow cytometry, FIG. 6B) The same cells assessed in (FIG. 6A) were characterized for functional migratory potential.

FIG. 7A) Flow cytometry plots of CAR-. expressing T cells assessed on day 9 of culture. FIG. 711) Transduced T cells were assessed. in for functionality by measuring degranulation in response to tumor cells.

FIG. 8A) Fold change and FIG. 8B) viability assessed at day 14 of culture at varying cell:carrier ratios.

DETAILED DESCRIPTION OF THE DISCLOSURE

Figure 1A:
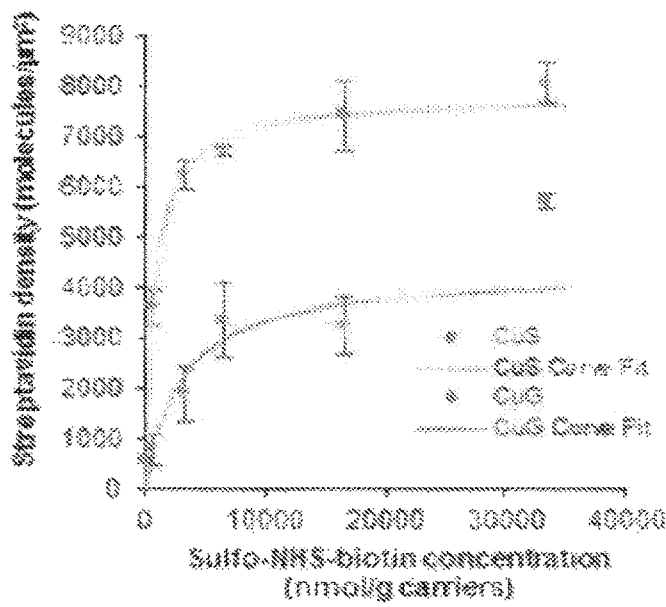
FIGS. 1A-1B. Optimization of streptavidin coating of microcarriers.

As specified in the Background Section, there is a great need in the art to identify technologies for improved methods and systems for large-scale production of suspension cells, such as for example and not limitation, T cells, and use this understanding to develop novel bioprocessing systems and methods. The present disclosure satisfies this and other needs, Embodiments of the present disclosure relate generally to synthetic microenvironment capable of mimicking T cell niches within secondary lymphoid organs (such as for example and not limitation, lymph nodes) and more specifically to macroporous 3D microcarriers that can be functionalized with antibodies to promote suspension cell (e.g., T cell) activation and expansion to mimic the environment found in lymph nodes. The systems should provide suspension cells with improved potency and efficacy and allow for specific sub populations to expand selectively, it is to such systems and methods of producing suspension cells, such as for example and not limitation, T cells, that embodiments of the present disclosure are directed. T cells produced by the systems and methods described herein include, but are not limited to, recombinant. T gene modified T cells, chimeric antigen receptor (CAR) cells, unmodified T cells, and CCR7$^+$CD62$^+$ central memory T cells.

Current approaches for CAR-based ACT are severely constrained by (a) the limited availability of autologous T cells from cancer patients (b) difficulty in robustly and reproducibly expanding these cells to enough numbers for multiple administrations and (c) lack of quantifiable biomarkers that are predictive for functional anti-cancer potency across various tumors. Current state-of-the-art methods involve culturing patient-isolated T cells with α-CD3 antibodies (Ab) or α-CD3/α-CD28 Ab-functionalized beads with high amounts of interleukins (ILs; such as for example and not limitation, IL2, IL7 and/or IL15) in single cell suspension. Even industry-based efforts have adopted this process with only improvements being the use of (a) closed systems, e.g., bag-based cultures and (b) rocking platforms (e.g., the Wave bioreactor). The field will benefit greatly from improved manufacturing processes for reproducible, rapid, more-efficient expansion of highly-potent T cells, with reduced cost.

Thus, new cell-manufacturing and biomarker characterization concepts, that would allow large scale production of therapeutic CAR-T cells without losing their potency, are critically needed. The inventors hypothesized that mimicking the cell-cell and autocrine/paracrine communication as well as the hypoxic microenvironment of the lymph node (LN) (where T cell expansion takes place in the body) along with modern bioreactor technologies would significantly enhance expansion of CAR-T cells without loss in potency.

Herein is demonstrated the use of α-CD3/α-CD28-functionalized microcarriers and cultured human T cells in LN-mimicking 3D niches where T cells remain at high density with close cell-cell contact, and allow efficient paracrineIautocrine signaling. These parameters, absent from current T-cell manufacturing concepts, are likely critical since T cells secrete large amounts of ILs locally to promote rapid, large scale expansion. Thus, the systems and methods described herein could also reduce culture media and IL requirements, thereby significantly reducing cost. Although microcarriers arc primarily used for adherent cells, α-CD3/α-CD28 functionalization of microcarriers could allow T cells to be anchored to the microcarrier 3D structure for improved activation and/or expansion. Effects of low oxygen tension, various cell-seeding densities and α-CD3/α-CD28 ligand densities on expansion efficacy and T cell quality were also studied. Methods according to the disclosure can combine the LN-like niche with stirred tank or perfusion bioreactors, to affect dynamic, culture and flow perfusion and thus improve expansion efficacy (time and cell numbers), product quality, scalability and cost effectiveness. Further, porous microcarriers can mimic 3D LN-like niches. Microcarriers are widely used for bioreactor cultures of adherent cells (8-10), but not for non-adherent cells like T cells. The use of porous gelatin (denatured collagen) carriers with functionalized anti-CD3/anti-CD28 would allow us to anchor T cells to the scaffolds, mimic the extracellular matrix (ECM) microenvironment of LN, and mimic the APC/T-cell signaling events in a controlled manner. Porous microcarriers also provide a high surface area for culture and can be used with stirred tank and perfusion bioreactors to ensure large-scale culture. Stirred tank, bioreactors allow for easy scale-up of cultures and are widely investigated in cell bioprocessing (11-13). A single bioreactor can replace a large number of static petri-dishes, can provide a closed-culture system to reduce handling and contamination during manufacturing, eventually provide automated monitoring of culture parameters (oxygen, pH, etc.) and can have better nutrient mixing. Porous microcarriers can be suspended in stirred tank bioreactors for rapid scale up.

Microcarrier cultures were originally developed for large-scale culture of anchorage-dependent cells. Microcarriers allow for high density cell culture; typically, about two orders of magnitude higher cell densities (up to 2×10$^8$ cells/mL, compared to 2-3×10$^6$/mL cells without microcarrier) (18). This enables scaling up of cell manufacturing processes with smaller footprints with reduced overall consumption of expensive media, serum and growth factors. Porous microcarriers are particularly suited for high density culture and significantly increase the available surface area for sell. In addition, porous microcarriers are better protected against unwanted mechanical stress generated in bioreactors (II) However, microcarriers are typically always used for anchorage dependent cells (8-10). Herein it is shown that T cells are also ideal candidates for porous microcarrier-based expansion because; (a) it allows high density culture similar to that inside LNs, thus providing autocrine/paracrine IL signaling; (h) allows functionalization of the carrier surface with anti-CD3/CD28, thus avoiding bead-based signaling. Specific, non-limiting embodiments described herein use the Cultispher G microcarriers (Hyclone) due to several reasons: i) this microcarrier is made of gelatin, which is derived from collagen, one of the most abundant structural components of the LN ECM; ii) chemical surface modification is possible by use of unreacted amine or carboxylic acid groups in gelatin (as shown in U.S. Pat. No. 8,318,492); iii) upon completion of culture, close, to 100% cell harvesting is possible by complete dissolution of gelatin matrix with enzymatic (e.g. trypsin) digestion; iv) highly crosslinked cavernous structure with high interior surface area allows greater number of cells (>2,000) per microcarrier that are well protected from shear stress; and v) great mechanical stability that allows for a long term culture.

To provide activation signals to CAR-T cells in 3-D, the surface of the porous microcarriers was modified with anti-CD3/anti-CD28 Abs in varying densities. In some non-limiting embodiments, sulfo-NHS-biotin (Life Technologies) was conjugated to the amine groups of gelatin followed by incubation with streptavidin to generate a fully streptavidin modified microcarrier. Streptavidin was thus a biolinker for further modification with biotinylated anti-CDS and anti-CD28 Abs. By controlling the relative concentrations of biotinylated Abs, it was possible to systematically vary the surface density of Abs. In other embodiments, amine- or carboxylate-reactive reagents (e.g., carbodiimide (EDC) or N-hydroxysulfosuccinimide (sulfo-NHS), Lift Technologies) were used to functionalize the gelatin-based microcarriers with, for example and not limitation. Protein A or (3, which bind in high affinities to Fe region of Abs with different number of binding sites per molecule (5 and 2, respectively). It was possible to vary the overall density of anti-CD3/anti-C28 Abs on the microcarrier surface by changing incubation concentrations, and also systemically vary the local valency by changing using streptavidin, Protein A or Protein G.

Various bioreactors have been employed for scale-up cell manufacturing to enhance homogeneity of the system (including elements such as nutrients, cytokine/growth-factors, oxygen, cell density, etc.), improve sterility (closed system design), and augment biological functions (shear, flow) (19). Spinner flasks or stirred tank bioreactors (11-13) are the most-explored platform that supports expansion of a variety of cell types including 3D cellular organizations (20). These bioreactors create a homogeneous physicochemical environment (19). However, the stirrer (or spinner) can apply irregular amount of mechanical shear forces on suspended cells and cell aggregates. Perfusion bioreactors, on the other hand, minimizes such high shear, and can deliver fresh nutrients and cytokines continuously while imposing fluid mechanical forces on cells in a more controlled manner (21-24). In cultures with microcarriers, the high cell density requires frequent media exchanges, in which case the application of perfusion has significant benefit. Perfusion rates can be controlled to mimic the interstitial fluid flow regime (15), such as for example and not limitation, flow in the LN niches. In some embodiments of the present disclosure, stirred-tank type ambrTM micro-bioreactor systems (TAP Biosystems) that allows bioprocess optimization at microscale (10-15 ml) are used, mimicking the core characteristics of classical bioreactors, but with reduced use of media and growth factors. Other embodiments can Use the CardGen perfusion bioreactor system (model C9-x, Instron), optionally without employing the compression feature due to the unknown effects of the associated mechanical stimuli. In either embodiment, fresh media can be perfused using, a common flow loop in a varying flow rate, closely mimicking the physiological interstitial flow rate, ranging from 0.1-2.0 µm/s 25.

Another major challenge for CAR-T cell manufacturing is that extensive expansion results in decreased potency, which is related to the differentiation status of T cells before and after the expansion. The systems and methods of the present disclosure result in improved potency relative to current methods of expansion.

Definitions

To facilitate an understanding of the principles and features of the various embodiments of the disclosure, various illustrative embodiments arc explained below. Although exemplary embodiments of the disclosure are explained in detail, it is to be understood that other embodiments are contemplated. Accordingly, it is not intended that the disclosure is limited in its scope to the details of construction and arrangement of components set forth in the following description or examples. The disclosure is capable of other embodiments and of being practiced or carried out in various ways, also, in describing the exemplary embodiments, specific terminology, will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest -meaning as understood by those skilled in the art and includes all technical equivalents which operate in a similar manner to accomplish a similar purpose. It is to be understood that embodiments of the disclosed technology may be practiced without: these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic.

Farther, repeated use of the phrase "in one embodiment" does not necessarily refer to the same embodiment, although it may.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Further, the term "about" means within an acceptable error range for the particular value as determined by one of ordinary skill in the art, which will depend in part on how the value is measured or determined, i.e., the limitations of-the measurement system. For example, "about" can mean within an acceptable standard deviation., Per the practice in the art. Alternatively, "about" can mean a range of up to ±20%, preferably up to ±10%, more preferably up to ±5%, and more preferably still up to +1% of a given value. Alternatively, particularly with respect to biological systems or processes, the term can mean within an order of magnitude, preferably within 2-fold, of a value. Where particular values are described in the application and claims, unless otherwise stated, the term "about" is implicit and in this context means within an acceptable error range for the particular value.

By "comprising" or "containing" or "including" is meant that at least the named compound, clement, particle, or method step is present in the composition or article or method, but does not exclude the presence of other compounds, materials, particles, method steps, even if the other such compounds, material, particles, method steps have the same function as what is named.

Throughout this description, various components may be identified having specific values or parameters, however, these items are provided as exemplary embodiments. Indeed, the exemplary embodiments do not limit the various aspects and concepts of the present disclosure as many comparable parameters, sizes, ranges, and/or values may be implemented. The terms "first," "second," and the like, "primary," "secondary," and the like, do not denote any order, quantity, or importance, but rather are used to distinguish one element from another, it is noted that terms like "specifically," "preferably," "typically," "generally," and "often" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. It is also noted that terms like "substantially" and "about" are utilized herein to represent the inherent degree of uncertainty that may be attributed to any quantitative comparison, value, measurement, or other representation, The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "50 mm" is intended to mean "about 50 mm."

It is also to be understood that the mention of one or more method steps does not preclude the presence of additional method steps or intervening method steps between those steps expressly identified. Similarly, it is also to be understood that the mention of one or more components in a composition does not preclude the presence of additional components than. those expressly identified.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure, for example. Any dimensions listed in the various drawings are for illustrative purposes only and are not intended to be limiting. Other dimensions and proportions are contemplated and intended to be included within the scope of the disclosure.

As used herein, the term "subject" or "patient" refers to mammals and includes, without so limitation, human and veterinary animals. In a preferred embodiment, the subject is human.

In accordance with the present disclosure there may be employed conventional molecular biology, microbiology, and recombinant DNA techniques within the skill of the art. Such techniques are explained fully in the literature. See, e.g. Sambrook, Fritsch & Maniatis, *Molecular Cloning: A Laboratory Manual*, Second Edition (1989) Cold Spring Harbor Laboratory Press, Cold Spring Harbor, New York. (herein "Sambrook et al., 1989"); *DNA Cloning: A Practical Approach*, Volumes I and II (D. N. Glover ed. 1985); *Oligonucleotide Synthesis* (M. J. Gait ed. 1984); *Nucleic Acid Hybridization* (B. D. Hames & S. J. Higgins eds. (1985); *Transcription and Translation* (B. D. Hames & S. J. Higgins, eds. (1984); *Animal Cell Culture* (R.1, Freshney, ed. (1986); *Immobilized Cells and Enzymes* (IRL Press, (1986); B. Perbal, *A Practical Guide To Molecular Cloning* (1984); F. M. Ausubel et al. (eds.), *Current Protocols in Molecular Biology*, John Wiley & Sons, Inc. (1994); among others.

Synthetic Microenvironments of the Disclosure

The present disclosure provides a system for mimicking the secondary lymphoid organs where suspension cells (e.g., T cells) are expanded; methods of expanding, activating, and transecting the suspension cells in the synthetic microenvironment, and suspension cells produced by such systems and methods.

In one aspect, the disclosure provides a system for expanding, activating, and/or transfecting suspension cells comprising: a porous microcarrier; and the suspension cells.

In some embodiments, the suspension cells are isolated from a patient's blood or organs, including both normal and/or diseased tissues.

In some embodiments, the suspension cells are T cells.

In other embodiments, the porous microcarrier is three dimensional. In some embodiments, the porous microcarrier comprises proteins, carbohydrates, lipids or nucleic acids. In some embodiments, the porous microcarrier comprises gelatin or other extracellular matrix components.

In yet other embodiments, the porous microcarrier is functionalized. In some embodiments, the functionalized porous microcarrier comprises at least one of antibodies, aptamers, and phage-display identified peptide ligands.

In some embodiments, the antibodies comprise antibodies that are specific for the suspension cells. In other embodiments, the antibodies comprise antibodies that are specific for T cells. In some embodiments, the antibodies comprise anti-CD2, anti-CD3 and/or anti-CD28 antibodies.

In an embodiment, the system in any of the preceding embodiments further comprises a bioreactor. In some embodiments, the bioreactor comprises a closed bioreactor and an open bioreactor. In some embodiments, the open bioreactor comprises a static culture vessel with a gas-permeable bottom. In other embodiments, the closed bioreactor comprises a stirred-type bioreactor, a bag bioreactor, and a perfusion bioreactor.

In another embodiment, the system in any of the preceding embodiments further comprises at least one of culture medium, at least one cytokine, and/or at least one viral vector, and optionally at least one growth factor.

In some embodiments, the at least one cytokine comprises IL2 and optionally at least one of IL7 or IL5. In other embodiments, the at least one viral vector is configured for use in gene therapy (such as for example and not limitation, a lentiviral vector, a retroviral vector, an adenoviral vector, and an adeno-associated viral vector).

In any of the embodiments described herein, the suspension cells can comprise recombinant T cells, gene modified T cells, chimeric antigen receptor (CAR) T cells, unmodified T cells, and/or CCR7$^+$CD62$^+$ central memory T cells.

In some embodiments, the at least one viral vector comprises a CAR transgene and optionally at least one additional gene, wherein the at least one additional gene comprises therapeutic genes, surface marker genes, reporter genes, suicide genes, chemokine receptor genes, cytokine-expressing genes, and/or immune-checkpoint receptor genes.

In any of the preceding embodiments, the porous microcarrier is macroporous. In some embodiments, the porous microcarrier is degradable, such as for example and not limitation, biodegradable.

In a related aspect, the disclosure provides a method of expanding, activating, and/or transfecting suspension cells, the method comprising: obtaining a blood sample from a patient isolating suspension cells from the blood sample; introducing the suspension cells to a bioreactor comprising a porous microcarrier; activating the suspension cells; expanding the suspension. cells; optionally transfecting the suspension cells; preparing the suspension cells for transfusion into the patient; and transfusing the suspension cells into the patient. lit some embodiments, the blood or tissue sample is obtained by leukapharesis.

In other embodiments, the suspension cells are T cells.

In some embodiments, the step of isolating suspension cells from the blood sample farther comprises bead separation or magnetic bead separation.

In other embodiments, the bioreactor comprises a closed bioreactor and an open bioreactor. In some embodiments, the closed bioreactor comprises a stirred-type bioreactor, bag bioreactor, and to perfusion bioreactor. In other embodiments, the open bioreactor comprises a static culture -vessel with a gas-permeable bottom.

In some embodiments, the porous microcarrier is three dimensional. In other embodiments, the porous microcarrier comprises proteins, carbohydrates, lipids or nucleic acids. In still other embodiments, the porous microcarrier comprises gelatin or other extracellular matrix components.

In some embodiments, the porous microcarrier is functionalized. In other embodiments, the functionalized porous microcarrier comprises at least one of antibodies, aptamers, and phage-display identified peptide ligands. In still other embodiments, the antibodies comprise antibodies that are specific for the suspension cells. In some embodiments, the antibodies comprise antibodies that are specific for T cells. In some embodiments, the antibodies comprise anti-CD2, anti-CD3 and/or anti-CD28 antibodies.

In an embodiment of any of the foregoing methods, the method further comprises at least one of culture medium, at least one cytokine, and/or at least one viral vector, and Optionally at least one growth factor. In some embodiments, the at least one cytokine comprises IL2, and optionally at least one of IL7 or IL15.

In an embodiment of any of the foregoing methods, the activation step further comprises agitation, optionally under hypoxic conditions. In some embodiments, the agitation can be periodic or continuous. In other embodiments, the activation step can last for at least one day, at least two days, at least three days, and at least four days, and all ranges of time in between.

In an embodiment of any of the foregoing methods, the expansion step further comprises seed trains, optionally under hypoxic conditions. For example and not limitation, the expansion step can include increasing the size of the flask and/or bioreactor as the culture grows, which can also involve moving the expanding cells to a new vessel, and culture media exchanges every 2-3 days (particularly if a static culture). The expansion step can last for at least one day, at least two days, at least three days, at: least four days, at least five days, at least six days, at least seven days, at least eight days, at least nine days, at least ten days, and at least eleven days, and all ranges of time in between.

In an embodiment of any of the foregoing methods, the optional transfection step further comprises adding at least one viral vector to the bioreactor comprising the suspension cells.

In an embodiment -of any of the foregoing methods, the suspension cells comprise recombinant T cells, gene modified T cells, chimeric antigen receptor (CAR) T cells, unmodified T cells, and/or CCR7$^+$CD62$^+$ central memory T cells.

In some embodiments, the at least one viral vector is configured for use in gene therapy, In other embodiments, the at least one viral vector comprises a CAR transgene and optionally at least one additional gene, wherein the at least one additional gene comprises therapeutic genes, surface marker genes, reporter genes, suicide genes, chemokine receptor genes, cytokine-expressing genes, and/or immune-checkpoint receptor genes.

In an embodiment of any of the foregoing methods, the preparation step further comprises cell expansion and downstream bioprocessing. In some embodiments, the cell expansion and downstream bioprocessing comprises cell separation, purification, packaging, preservation, storage, shipping and transport, thawing, formulation, resuspension, and transfusion.

In an embodiment of any of the foregoing methods, the transfusion step further comprises injection, intravenous administration, and implantation (such as for example and not limitation, implantation of a sustained delivery device).

In an embodiment of any of the foregoing methods, the porous microcarrier is macroporous. In any of the preceding embodiments, the porous microcarrier is macroporous. In some embodiments, the porous microcarrier is degradable, such as for example and not limitation, biodegradable.

In a related aspect, the disclosure provides a T cell obtained from any of the systems disclosed herein.

In a related aspect, the disclosure provides a T cell obtained from any of the methods disclosed herein.

In one embodiment, the T cell is a memory cell. In another embodiment, the T cell is CCR7$^+$CD62L$^+$. In another embodiment, the T cell is a central memory T cell. In yet another embodiment, the T cell is a CD4 T cell or a CD8 T cell. In some embodiments, the T cell to comprises recombinant T cells, gene modified T cells, chimeric antigen receptor (CAR) T cells, unmodified cells, and/or CCR7$^+$CD62$^+$central memory T cells.

In a related aspect, the disclosure provides a composition comprising at least one T cell as described herein. In some embodiments, the composition further comprises at least one carrier, In other embodiments, the composition is formulated for intravenous administration.

In a related aspect, the disclosure provides a pharmaceutical composition comprising at least one T cell as described herein. In some embodiments, the pharmaceutical composition further comprises at least one carrier. In other embodiments, the composition is formulated for intravenous administration. In some embodiments, the pharmaceutical composition further comprises at least one additional therapeutic agent.

In a related aspect, the disclosure provides the use of a composition (including a pharmaceutical composition) as described herein to treat a disease or condition in a patient in need thereof. In some embodiments, the disease or condition comprises genetic diseases, cancers, infections, autoimmune diseases, and/or transplant complications. In some embodiments, the use further comprises a second therapeutic method or agent, such as for example and not limitation, a cancer drug, an immunotherapeutic, an immunosuppressant, an autoimmune therapeutic agent, and/or a therapeutic for treating infections.

In a related aspect, the disclosure provides method of treating a disease or condition in a patient in need thereof, comprising administering a composition (including a pharmaceutical composition) as described herein to said patient. In some embodiments, the disease or condition comprises genetic diseases, cancers, infections, autoimmune diseases, and/or transplant complications. In some embodiments, the treatment further comprises a second therapeutic method or agent, such as for example and not limitation, a cancer drug, an immunotherapeutic, an immunosuppressant, an autoimmune therapeutic agent, and/or a therapeutic for treating infections.

In an embodiment of any of the foregoing systems, the porous microcarrier is configured for activation, expansion, and/or transfection of the suspension cells.

In an embodiment of any, of the foregoing methods, the porous microcarrier is configured for activation, expansion, and/or transfection of the suspension cells.

EXAMPLES

The present disclosure is also described and demonstrated by way of the following examples. However, the use of these and other examples anywhere in the specification is illustrative only and in no way limits the scope and meaning of the disclosure or of any exemplified term. Likewise, the disclosure is not limited to any particular preferred embodiments described here. Indeed, many modifications and variations of the disclosure may be apparent to those skilled in the art upon reading this specification, and such variations can be made without departing from the disclosure in spirit or in scope. The disclosure is therefore to be limited only by the terms of the appended claims along with the full scope of equivalents to which those claims are entitled.

Example 1

Development of the Synthetic Microcarrier System

Current T cell expansion technologies do not fully recapitulate the secondary lymphoid organs where T cell are expanded with close cell-cell contact under hypoxic conditions. Herein, functionalized microcarriers were used in combination with modern bioreactors to create 3D niches where T cells are stimulated to expand with anti-CD3 and and-CD28 antibodies while remaining in close cell-cell contact. The high surface density of those microcarriers encouraged high call density and efficient signaling, while cytokine requirements, media usage, and bioreactor footprint were reduced.

Development and Optimization of Antibody-Coated Microcarriers

Anti-CD3 and anti-CD28-coated microcarriers were generated by functionalizing the surface of Cultispher gelatin microcarriers by (1) conjugating sulfo-NHS-biotin to amine groups of gelatin, (2) incubating with streptavidin to create a fully streptavidin-coated microcarrier, and (3) adding biotinylated anti-CD3 and anti-CD28 antibodies at controlled densities to regulate the antibody surface density.

Cultispher-S (CuS) and Cultispher-G (CuG) are two types of microcarriers commonly used in cell manufacturing and bioprocessing. They are gelatin-based and thus have many lysine residues that can be functionalized using N-hydroxysuccinamide (NHS) chemistry. These carriers were functionalized using streptavidin-biotin chemistry due to the availability of in biotinylated antibodies, the ease of use for this method, and the relative stability of this system. Sulfo-NHS-biotin was the chosen crosslinker for this system due to its solubility in water and its relatively short spacer arm, which likely maximized the availability of open streptavidin binding sites that can bind to antibodies.

First, the inventors quantified the amount of streptavidin that could be hound to the surface as a function of biotinylation (FIG. 1A). Microcarriers were first biotionylated using varying amounts sulfo-NHS-biotin, and streptavidin was then introduced in excess to evenly coat the surface. Unreacted streptavidin from the supernatant was measured using the BCA assay, which was then used in combination with the estimated surface area of CuS and CuG microcarriers to determine the streptavidin surface density as a function of the sulfo-NHS-biotin concentration. It was assumed that the difference between the amount of streptavidin added to the suspension and the amount of streptavidin remaining in the supernatant was equal to the amount of bound streptavidin. To make each curve in FIG. 1A, all samples were repeated in duplicate and error bars in the chart represented standard deviation about the mean. The curve fit was found using a modified Scatchard plot analysis, which followed standard receptor-ligand kinetics and thus showed saturation of the binding sites in a hyperbolic fashion. The molecules per area was determined using the amount of streptavidin remaining in the supernatant and dividing, by the surface area of the microcarriers (mass of microcarriers was known and the manufacturer supplied the surface area per carrier mass. The estimated surface areas for CuS and CuG microcarriers were 19,000 $cm^2$ and 24,000 $cm^2$, respectively). Cultisper S has much higher binding efficiency, therefore this microcarrier was used in all further experiments.

Figure 1B:
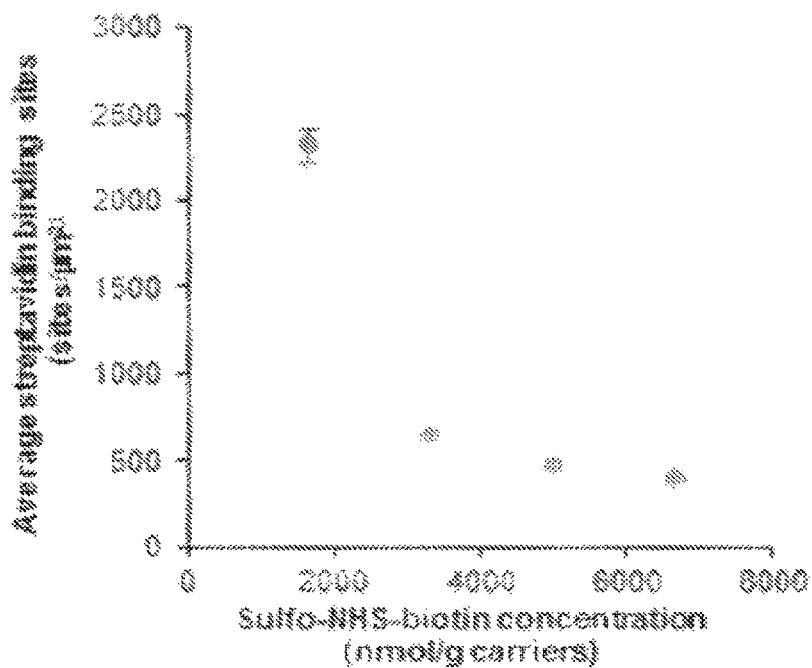

Excess biotin linked to the surface may negatively impact antibody attachment efficiency, as it could theoretically block all available binding sites on the bound streptavidin molecules. As streptavidin has four binding sites, each molecule generally has a few sites occupied biotins attached to the surface of the microcarrier and the remainder are available to attach to biotinylated ligands such as antibodies; FIG. 1B quantified the remaining open binding sites as a function of biotinylation. Microcarriers were coated as described herein and the number of available binding sites was quantified using a fluorimeter with FITC-biotin as a surrogate ligand. FITC-biotin was added to the suspension of streptavidin coated microcarriers and the supernatant was assessed for fluorescence to quantify the amount of unbound FITC-biotin which was then used to find the amount of bound FITC-biotin (analogous to (FIG. 1A) above). One mole of FITC-biotin was assumed to be one mole of available binding sites. The area used for the calculation of binding sites/$\mu m^2$ was 19000 $cm^2$. Together, these show that approximately 5000 nmol/g of sulfo-NHS-biotin is optimal for maximizing ligand surface density, as this keeps the streptavidin surface density near saturation (and thus ensured an event coating throughout the carrier), while also maintaining a significant number of open binding sites.

Figure 2A:
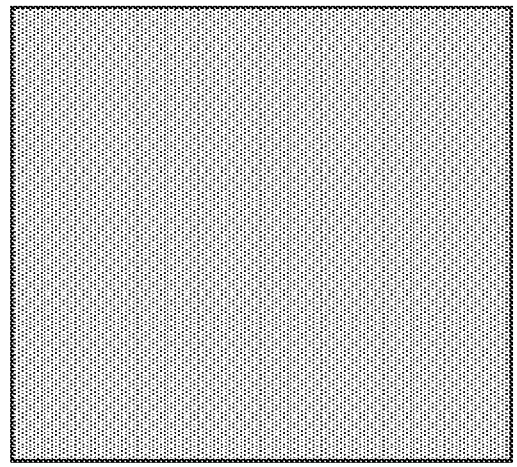
FIGS. 2A-2B. Verification of open biotin binding sites. Zeiss Lightsheet microscope imaging of (FIG. 2A) uncoated CuS microcarriers and (FIG. 2B) CuS microcarriers optimally coated with streptavidin and saturated with MC-biotin.
Figure 2B:
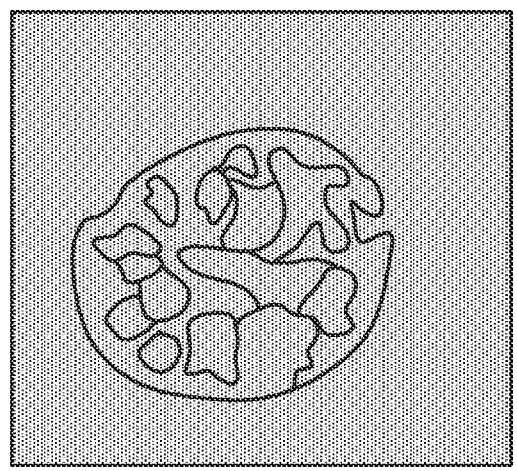

FIG. 2 demonstrated a verification of open biotin binding sites via Zeiss Lightsheet microscope imaging of (A) uncoated CuS microcarriers and (B) CuS microcarriers optimally coated with streptavidin and saturated with FITC-biotin. Laser power was fixed to 10% in both oases. Since the microcarriers were macroporous and thus could support cell growth on the interior, it was important to show that the conjugation strategy as described could evenly and comprehensively coat the entire surface of the microcarriers, including within the macropores on the interior surface. FIG. 2 demonstrated this even coating because the interior of the microcarriers appears comparably bright to the outer surface at a middle cross section, showing that we have coated the core. Furthermore, the uncoated sample rules out autofluorescence (background signal) which one might expect due to the fact that the carriers are protein-based.

TABLE 1

Scale up of CuS microcarrier coating procedure. Anti-CD3 and anti-CD28 antibodies were added in a 1:1 ratio, and the Ab coating procedure was repeated for small, medium, and large batch sizes to verify process scalability. Parameters in medium and large batches were scaled proportionally to the small batch size.

| Microcarrier dry weight | Small (15 mg) | Medium (150 mg) | Large (300 mg) |
|---|---|---|---|
| Streptavidin/$\mu m^2$ | 7500 | 8500 | 8200 |
| Biotin-binding sites/$\mu m^2$ | 1200 | 2700 | 1400 |
| Antibodies/$\mu m^2$ | 2600 | 3000 | 2600 |
| Antibody:Streptavidin Ratio | 0.35 | 0.35 | 0.31 |

Figure 3:
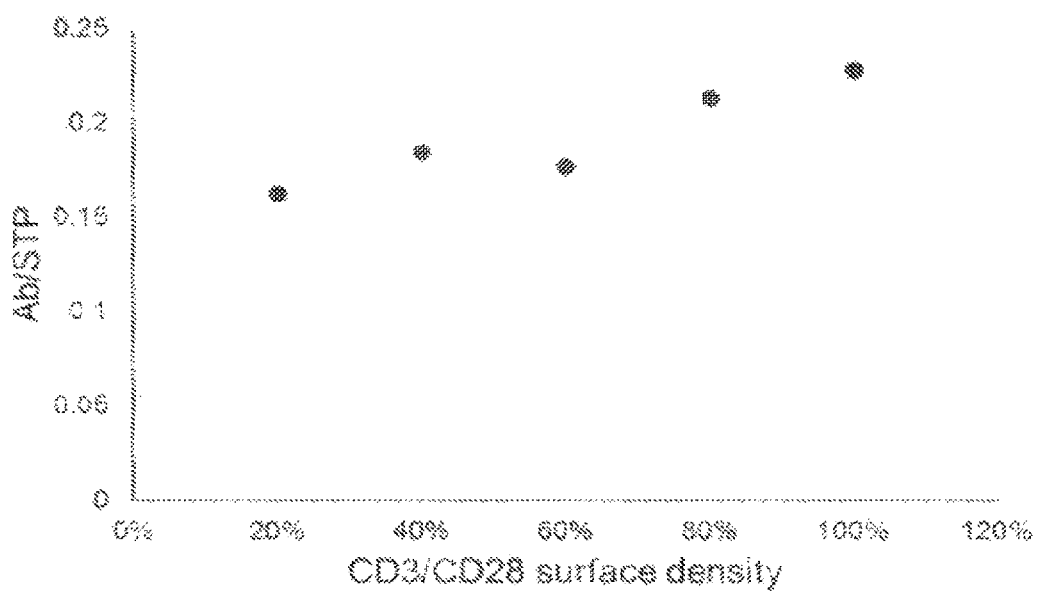
FIG. 3. Antibody coating density as function of CD3/CD28 percentage, Microcarriers coated with streptavidin were conjugated using mAb cocktails that contained varying amounts of biotinylated isotype control (calculated as percentage CD3/CD28 mAb mass with CD3/CD28 ratio as 1:1).

As shown in FIG. 3, microcarriers coated with streptavidin were conjugated using momoclonal (mAb) cocktails that contained varying amounts of biotinylated isotype control (calculated as percentage CD3/CD28 mAb mass with CD3/CD28 ratio as 1:1). This demonstrated that the isotype control mAbs and CD3/CD28 antibodies likely hind very similarly, thus showing that it is possible to control the amount of activating antibodies (CD3 and CD28) by spiking the cocktail used to coat the microcarriers with a non-binding antibody (isotype control). In summary, it is possible to fine-tune the activation signals delivered on the microcarriers to expand T cells, which can make the microcarrier platform more adaptable.

Variable Signaling Density on Microcarriers

An interesting parameter to vary is the signal strength delivered on the surface of each microcarrier; this will require varying the number of CD3 and 0.028 antibodies conjugated to the carriers. To accomplish this, the inventors spiked the CD3/CD28 biotinylated mAb cocktail with a biotinylated isotype control (by definition, an antibody with unknown target) prior to adding the cocktail to the carriers for conjugation. In theory, the isotype control should displace the available binding sites for the CD3/CD28 mAbs, effectively reducing the signal strength that can be delivered per unit surface area. Signal strength was expressed as a percentage of full saturation. Microcarriers were coated at different signal strengths according to this method, and the total mAb density was determined indirectly by measuring the supernatant with the BCA protein assay. The slight downward slope of these data indicate that the binding efficiency appears to be consistent, but the isotype control may have a slightly less binding capacity than the CD3/CD28 mAbs (possibly due to differences in biotinylation capacity).

To test the effectiveness of the varied signal strength, the inventors seeded primary human T cells on microcarriers with signal densities ranging from 100% to 0% with 20% intervals. Cells were assessed on day 3 for qualitative differences in activation potential (cell clusters, cell enlargement, media color changes). The media color ranged from yellow (100%) to pinkish red (0%) indicating a differential metabolic activity between the groups, which in turn was indicative of differential activation. This demonstrated that changing the signal density on the microcarrier surface can have significant influence on activation state, and therefore likely can contribute to T cell expansion and phenotype. T cell activation was further confirmed with the appearance of T cell clusters in the microcarriers.

Cell Seeding Onto Antibody-Coated Microcarriers

The loading procedure for Ab-coated CCS microcarriers was optimized using Jurkat cells, an immortalized line of human T lymphocytes. Two seeding methods were investigated, including a column seeding method and an extended orbital shaking method. The first procedure was designed to promote cell contact between cells and microcarriers in a syringe-based column, Briefly, the needle of a 0.5 mL syringe was removed using a dremel, and the mesh from a 40 um cell strainer was wrapped around the bottom. The syringe/filter was placed in a FACS tube and loaded with Ab-coated microcarriers, which were held in place by the cell strainer mesh. Media was then added such that the liquid level inside and outside the syringe was the same. Finally, 1 million Jurkat cells were pre-labeled with CFSE fluorescent dye and added to the column, and the assembly was centrifuged for 3 cycles of 5 minutes at 300 g followed by 10 minutes rest to promote cell attachment. Visualization of the cells within the microcarriers demonstrated that cell loading using this method was heterogeneous, with many microcarriers lacking cells. It was hypothesized that the short length of time (~30 min) may not be sufficient to allow for cell attachment to microcarriers.

An alternative cell seeding method using overnight orbital shaking was next investigated. Anti-CD3-coated carriers were loaded into a 12-well plate at a density of 12,000 microcarriers per well, to which 1 million Jurkat cells were added (83:1 cell to microcarrier ratio). The plates were placed in an incubator and continuously agitated on an orbital shaker at 60 rpm to promote cell attachment to the microcarriers. After 14 hours of attachment, cells appeared to preferentially surround the microcarriers. To directly quantify the degree of attachment, the contents of each well were filtered through a cell strainer to separate unattached cells from microcarriers plus attached cells. Recovered microcarriers were digested with dispase, which s dissolved the carriers and allowed for cell recovery and direct quantification, while unattached cells were quantified in the flow-through fraction. CD3-coated microcarriers achieved a greater percent cell attachment compared to non-coaled microcarriers (11.2±2.1% vs. 3.9±0.3%), as well as a concomitant decrease in the percent of unattached cells in the flow-through (73.2±8.4% vs. 92.5±1.6%), suggesting productive binding of T cells to anti-CD3-coated microcarriers.
Expansion of Primary Human T Cells Using Ab-Coated Microcarriers Having established preferential binding of Jurkat T cells to anti-CD3/CD28-coated microcarriers (albeit at low efficiency), it was next determined whether these functionalized microcarriers promoted the expansion of primary human I cells. As a first step, T cell expansion was verified using CD31CD28-loaded magnetic beads, which is the current state-of-the-art method for expansion of patient-isolated T cells. First, T cells were isolated from cryopreserved human PBMCs using a MACS pan-T cell isolation kit and seeded with anti-CD3/CD28-loaded MACSiBeads (cell:bead ratio=1:2). Cultures were expanded over a period of 28 days per manufacturer's instructions, which ultimately achieved a 50-fold expansion with a high exogenous IL-2 concentration of 400 U/mL. When exogenous IL-2 was omitted, only a 7-fold expansion Was achieved, which is consistent with previous findings that IL-2 enhances T cell expansion?. Further, T cells did not expand in the no-bead negative control, confirming that CD3/CD28 stimulation is required for T cell expansion.

Primary human I cells were expanded using either anti-CD3/CD28-coated microcarriers or IgG negative control-coated microcarriers. As a positive control, T cells were also expanded using anti-CD3/CD28-loaded MACSiBead to compare degree of expansion. The process of seeding T cells onto microcarriers was carried out as described (83:1 cell:microcarrier ratio using overnight attachment: on an orbital shaker), after which cultures were removed from the orbital shaker and allowed to expand for an additional 6 days with periodic media exchanges. At this 7 day timepoint, T cells cultured with anti-CD3/CD28-coated microcarriers expanded and formed aggregates of cells adjacent to microcarriers, while no such expansion occurred in cultures with IgG control-coated microcarriers. Anti-CD3/CD28-coated microcarriers achieved a 2.5-fold expansion over 7 days, which compared favorably with the 1,4-fold expansion observed with the MACSiBead culture. Therefore, anti-CD3/CD28 functionalized microcarriers were capable of stimulating primary human T cell expansion.

To determine whether T cells were expanding within the -interior macropores of the microcarriers, microcarriers plus attached cells were separated from any unattached cells using a 40 µm strainer, and cells were quantified in both the flow-through fraction (unattached) or the microcarrier-associated fraction (attached) as described previously. A majority of the cells were recovered in the flow-through fraction, with only 200,000 cells (7% of the total cell number) recovered in the microcarrier-attached fraction, suggesting low cell attachment to microcarriers. 3-(4,5-dimethylthiazol-2-yl)-2,5-diphenyltetrazolium bromide (MTT) staining of attached cells within isolated microcarriers confirmed the low level of cell loading and further demonstrated the heterogeneity of cell loading across microcarriers. Indeed, a few microcarriers had a dozen or more attached cells, while many more had no cell attachment at all. Therefore, it is likely that activation and expansion of T cells is -mostly occurring adjacent to the microcarriers rather than within the macropores.

Figure 4:
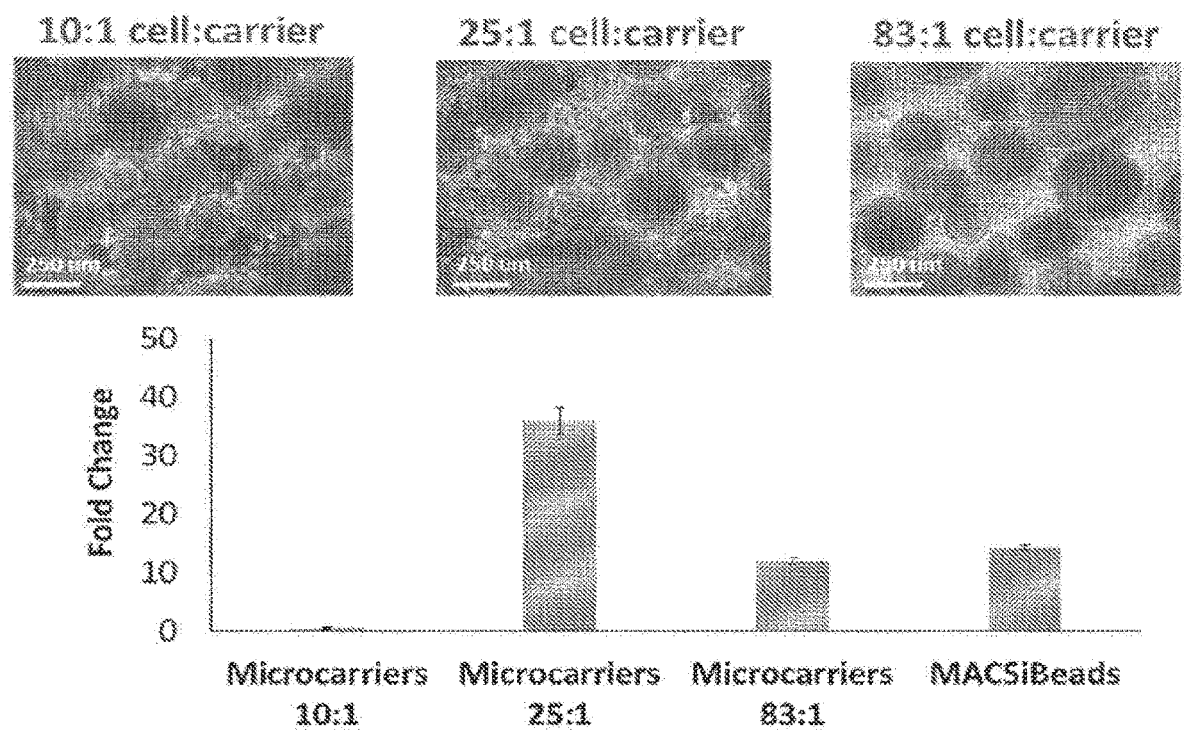
FIG. 4. Comparison of T cell expansion and MACS head expansion. Primary human T cells were expanded over 2 weeks in well plates in various culture conditions, (FIG. 4, Top)) Day 14 brightfield images of T cells expanded at the indicated cell:carrier ratio with the absolute number of carriers held constant.

FIG. 4 shows a comparison of T cell expansion and MACS bead expansion. Primary human T cells were expanded over 2 weeks in well plates in various culture conditions. FIG. 4, top shows Day 14 brightfield images of T cells expanded at the indicated cell:carrier ratio with the absolute number of carriers held constant. FIG. 4, bottom shows Day 14 fold change of microcarrier cultures at indicated ratios compared with cells grown in MACSibeads culture (conventional magnetic beads). MACSibeads cells were expanded according to the manufacturer's instructions at 1:2 cells:beads with a cell density of 2.5e6 cells/ml. Fold change was assessed after day 14 by counting cells using an automated cell counter. The data show that in the case of microcarrier culture there is an optimal cell:carrier ratio where the fold change outperforms conventional magnetic bead culture.

Figure 5:
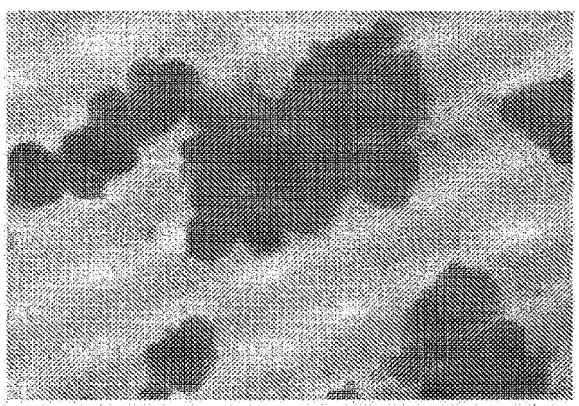
FIG. 5 depicts undisturbed microcarrier cultures forming 3D cell:carrier clusters.

When left undisturbed over the course of 14 day culture, T cells and microcarriers will form clusters as Shown in FIG. 5. As shown in FIG. 5, the microcarriers (approximately 10, seen as dark ovals) were pulled together by T cells (fuzzy grey clusters on the periphery of the microcarriers). These findings demonstrated that the microcarriers can facilitate cell:carrier adhesion and high cell density. High cell density is a key characteristic found in human lymph nodes that the invented system is configured to mimic.

Process Optimization of Microcarrier-Based Expansion

The inventors then sought to determine the effects of IL-2 and cell density on the expansion of T cells on microcarriers. To this end, the inventors created a 2×2 design matrix with high and low IL-2 and cell density levels. The levels for IL-2 were 50 and 400 U/ml, respectively, and the levels for cell density were 1e4/ml and 2.5e6/ml. Expansion and phenotype were evaluated after day 14. It was observed that within these conditions, only the higher density cell cultures expanded (the lower level did not expand at any measurable level). Maximal expansion can vary as a function of cell:carrier ratio depending on the donor. Between the two groups that did expand, IL-2 did not appear to affect expansion but may have influenced memory phenotype, as assessed using flow cytometry and markers CD62L, CCR7, and CD45RA, resulting in a higher population of central memory T cells (Tem), including CD4 and CD8 central memory T cells.

Figure 6A:
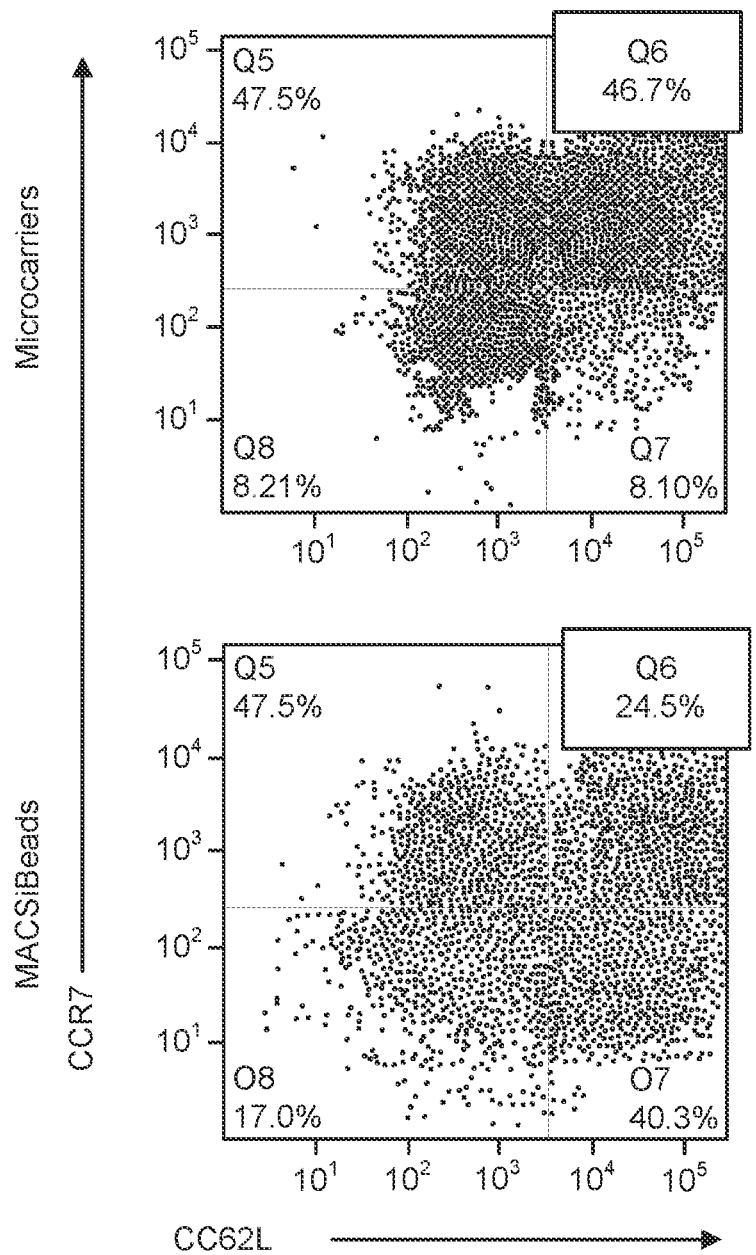
FIGS. 6A-6B, Assessment of memory subpopulations in microcarrier-expanded T cell cultures. T cells were expanded on microcarriers or MACSibeads cultures for 14 days and assessed via flow and transmigration assay.
Figure 6B:
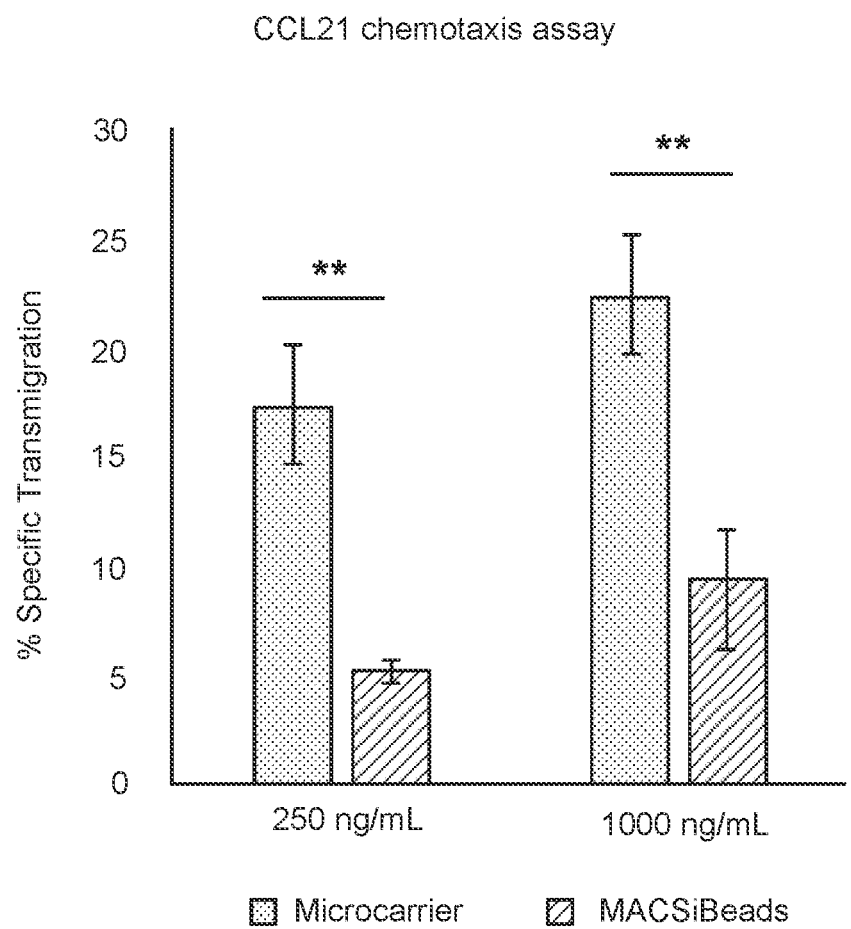

The inventors then farther characterized the memory T cell subpopulations expanded using the invented microcarrier system. As shown in FIG. 6, T cells were expanded on microcarriers or MACSibeads cultures for 14 days and assessed via flow and transmigration assay. FIG. 6A) Expanded T cells were assessed for CCR7 and CD62L populations using flow cytometry T cells that are CCR7$^+$ CD62L$^+$ are memory T cells that home to the lymph nodes and represent a population of T cells that have enhanced proliferative and migratory potential compared to effector T cells (CCR7$^-$CD82L$^-$). The qualities are important for cell immunotherapies because highly proliferative cells can divide more in response to tumor antigen encounter, thus increasing efficacy of the therapy. Migratory capacity is also important because migratory cells can travel to more locations throughout the body (especially the lymph nodes where tumor antigens may be encountered) and will last longer, providing long-lived protection, The data show that compared to MACSibeads cultures, the use of microcarriers in the invented. system led to a higher frequency of CCR7$^+$ CD62L$^+$ phenotypes. Thus, the invented system comprising microcarriers can produce higher quality T cells for immunotherapy. FIG. 6B) The same cells assessed in (FIG. 6A) were characterized for functional migratory potential. CCR7 is a receptor for the chemokine CCL21; binding of CCL21 to CCR7 will thus trigger a T cell to migration. When T cells were incubated in a transwell with CCL21 on the opposite side of a membrane, it was observed that more T cells crossed the membrane in the case of microcarrier-expanded T cells than MACSibeads expanded T cells. This confirmed the observations from (FIG. 6A) by demonstrating that the increased number of CCR7+CD62L+ T cells correlates with increased migration.

Lentiviral Transduction of Microcarrier T Cell Cultures

Figure 7A:
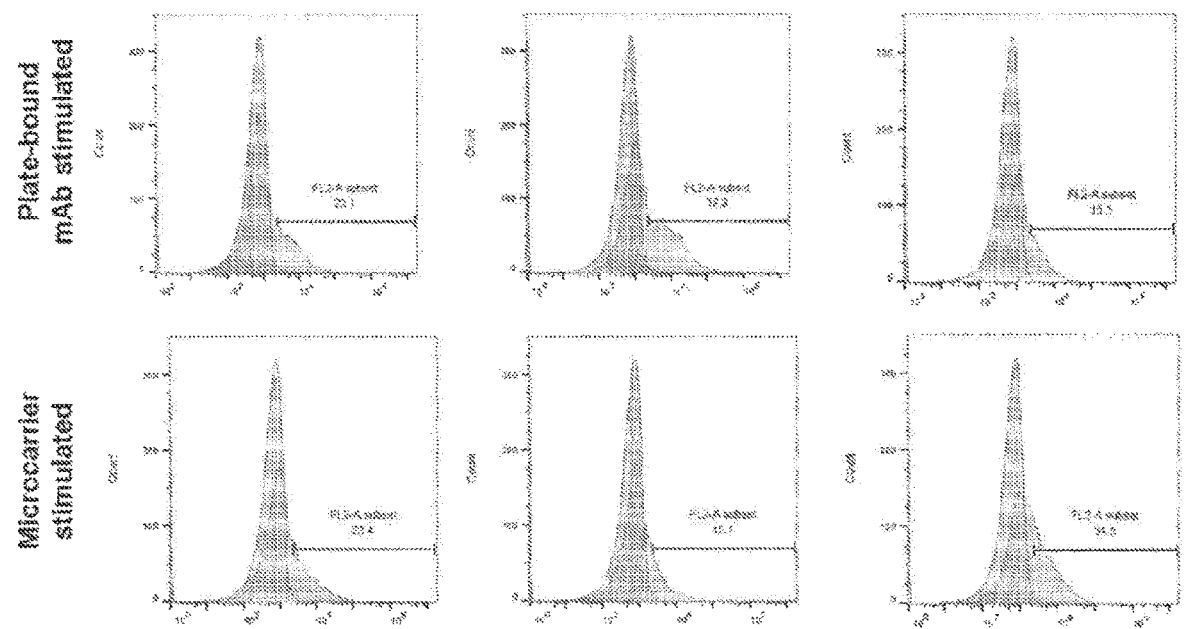
FIGS. 7A-7B. Lentiviral transduction of microcarrier T cell cultures. T cells were activated with either plate-bound antibodies or microcarriers and transduced with lentivirus expressing an anti-CD19 chimeric antigen receptor.
Figure 7B:
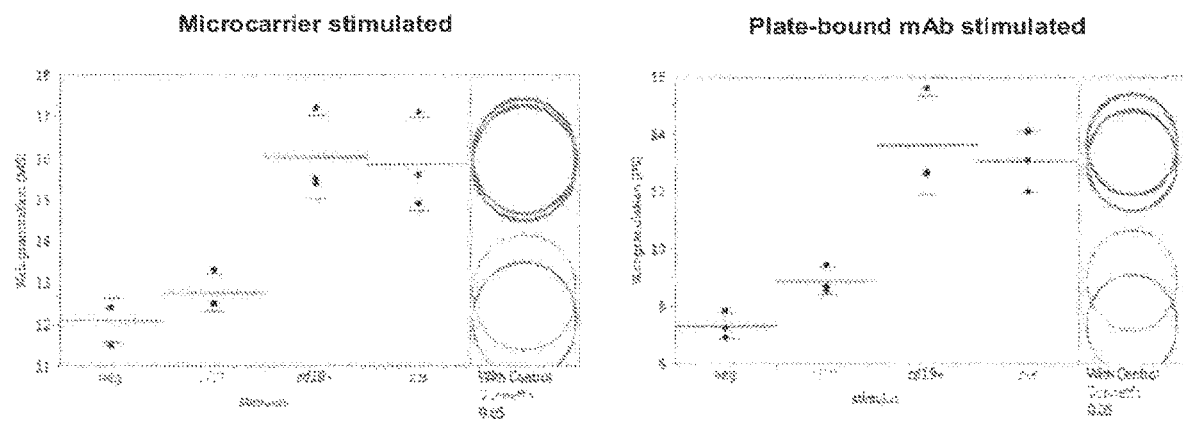

T cells were activated with either plate-bound antibodies or microcarriers and transduced with lentivirus expressing an anti-CD19 chimeric antigen receptor. FIG. 7A shows flow cytometry plots of CAR-expressing T cells assessed on day 9 of culture. CAR was labelled using biotinylated Protein L with APC-conjugated streptavidin as secondary. Plate-bound antibody stimulation is a conventional, small scale technique for T cell activation. T cells must be activated to be transduced by a lentivirus. These data demonstrated that microcarriers, while fundamentally different from widely used standards such as plate-bound activation, can still is provide a strong enough activation signal for T cells to be transduced at similar levels. FIG. 7B shows the functionality of transduced T cells by measuring degranulation in response to tumor cells. Degranulation was assessed in unstimulated (neg), K562 coculture (CD19−), K562−CD19+ coculture (CD19−), and anti-CD3-stimulated (pos) groups and was measured using flow cytometry and quantifying surface expression of CD107a. Degranulation of T cells is a hallmark of T cell cytotoxicity, which is important in assessing their ability to kill tumors. The model tumor cells in this case were K562 cells, and the target the T cells were programmed to attack was CD19. K562s are naturally do not express CD19 (the CD19− group in the chart) so a genetically engineered K562 line with CD19 inserted (CD19+) was utilized as a target with the ligand that the CAR T cells should recognize. This was also compared to a non-stimulated control, which should produce no degranulation, and a fully stimulated positive control using antibodies to, trigger degranulation. Each group was compared using an ANOVA and Control Dunnett's test with the control as the "neg" group and alpha of 0.05. In FIG. 7B, the circles to the right represent significance; non-overlapping circles indicate that groups are very significantly different. The data demonstrate that the in both plate-bound and microcarrier-groups, T cells showed elevated degranulation when presented with either CD19+ target coils or when stimulated with antibodies. The fact that the T cells did not show elevated degranulation in the CD19− group demonstrated that the CAR T cells did not recognize any other proteins on the K562 cells, ruling out off-target effects. In summary, these data show that T cells transduced using microcarriers are functionally equivalent to a widely used standard.

Microcarrier T Cell Cultures Across Multiple donors

Figure 8A:
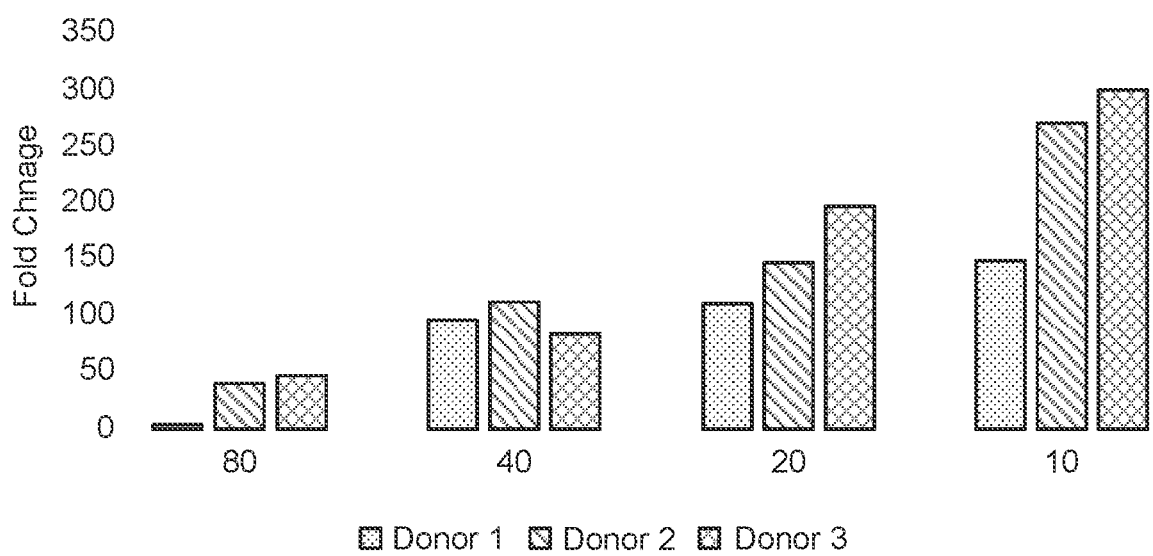
FIGS. 8A-8B. Microcarrier T cell cultures across 3 donors.
Figure 8B:
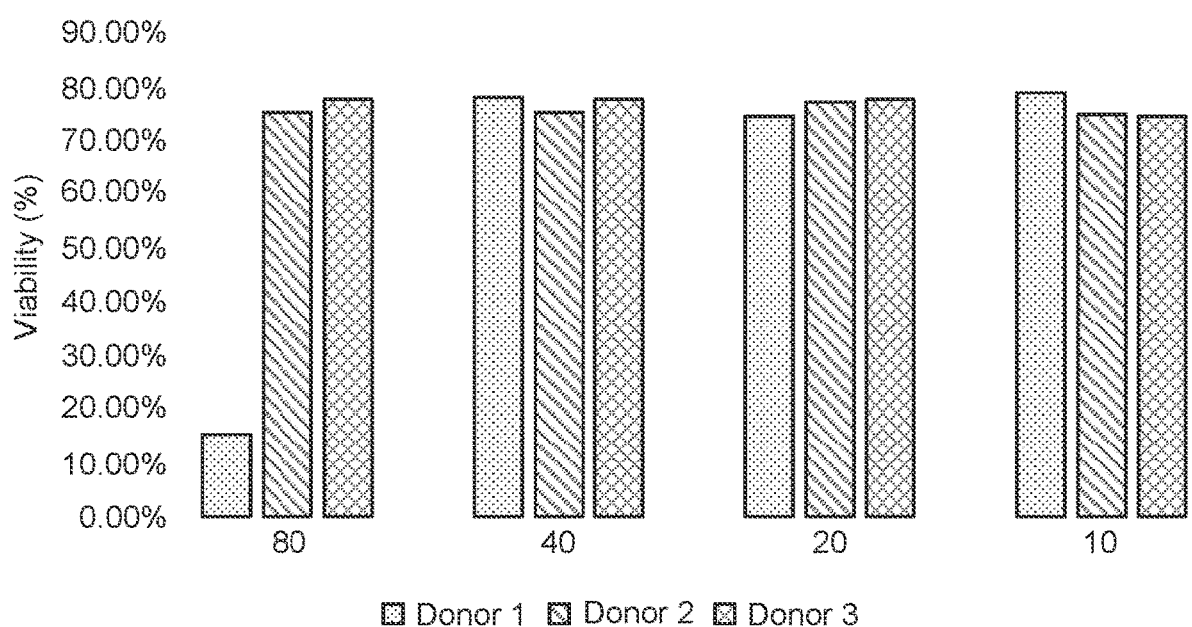

As shown herein, microcarriers can induce expansion of T cells, and this expansion may be superior to conventional techniques such as MACS) in terms of expansion capacity. The inventors next asked if this technique could work across multiple donors. The invented microcarrier system was tested at varying cell:carrier ratios (130:1 to 10;1) with constant carrier/well using T cells from 3 healthy donors (aged 25, 47, and 48) (FIG. 8). All donors showed similar trends, with lower cell:carrier ratios showing higher expansion. Furthermore, all groups showed similarly high viability (with the exception of one). Cell expansion roughly correlated with age, with the youngest donor (number 3) expanding the greatest in the majority of groups and the oldest (donor 1) expanding the least. This could be due to metabolic dysfunction that accumulates with age. Fold change (FIG. 8A) and viability (FIG. 8B) were assessed at day 14 of culture at varying cell-carrier ratios. These results demonstrated that the functionalized microcarriers showed the same trend across different donors, thus showing broad applicability. However, the exact behavior depends on each specific donor, with younger donors (donors 2 and 3) generally showing better expansion than the older donor (donor 1). Viability in most cases was also very high across all donors, which further demonstrates that the invented systems and methods are robust.

Materials and Methods

Microcarrier Functionalization

Cultispher S and Cultipher G microcarriers (HyClone) were suspended in 1× PBS at 15 mg/ml and autoclaved at 121° C. for 15 minutes. All subsequent steps were performed in a sterile environment. Carriers were biotinylated by adding 0.5 μl 10 mM sulfo-NHS-biotin (Thermo Fisher) per mg microcarriers to the suspension and vortexing continuously for 60 minutes at room temperature. Excess reagent was removed by washing the carriers 3 times with 1× PBS by diluting 15-fold. Streptavidin (Jackson ImmunoResearch) was added to the carrier suspension at 40 μg/ml and vortexed for 45 minutes. Supernatant samples for streptavidin quantification were taken after this step, and this was followed by 2 wash steps in PBS by diluting 15-fold. For antibody coating, biotinylated low endotoxin, azide free (LEAF) anti-CD3, anti-CD28, or mouse IgG1 isotype controls (Biolegend) were added at predefined mixtures to make a total antibody concentration of 30 μg/ml and vortexed for 60 minutes. The anti-CD3 and anti-CD28 ratio was always kept 1:1. Mouse IgG1 isotype control was added to some microcarriers to displace the anti-CD3/anti-CD28 antibodies for purposes of lowering the signal strength presented on the surface. Antibody-coated microcarriers were washed 2 times with 1× PBS by diluting 15-fold. Prior to cell culture, 1 ml of microcarriers at 15-20mg/ml was washed with 9 ml of appropriate media. Quantification of microcarriers was determined at the end of the process by sampling the microcarriers into a 96 well plate and counting manually, Streptavidin Binding Quantification Streptavidin binding was quantified indirectly by measuring unbound streptavidin in the supernatant immediately after the streptavidin conjugation and incubation steps. Streptavidin protein concentration was measured using a BCA assay (Thermo Fisher) according to the manufacturer's instructions with several modifications. Briefly, a log2 standard curve was created starting at 40 streptavidin (Jackson ImmunoResearch). The assay was performed in a TC-treated 96 well plate. All sample or standard volumes were 150 ul, and the added BCA reagent was 150 ul. The reaction was allowed to proceed in a dry incubator at 37° C. for 45-90 minutes prior to reading at 562 urn on a Biotek Plate Reader.

Microcarrier Binding Site Quantification

The number of open streptavidin binding sites was indirectly quantified by measuring the supernatant following FITC-biotin incubation. Immediately after washing excess streptavidin, microcarriers were suspended at 15 mg/ml, and 80 μl of 5 μM FITC-biotin (Thermo Fisher) was added to the carrier suspension and vortexed for 20 minutes. The carrier suspension was centrifuged at 4500g for 1 min to pull carriers to the bottom, and a 200 μl sample was assayed against a standard curve to quantify the unbound FITC-biotin.

Lightsheet Imaging of Functionalized Microcarriers

Binding site uniformity was confirmed qualitatively using a Zeiss Lightsheet microscope. Microcarriers were coated with streptavidin as described earlier and all binding sites were saturated with FITC-biotin. Microcarriers were then resuspended in 0.1% agarose heated to 70° C. and cast into a thin capillary. Streptavidin coated microcarriers without FITC-biotin were used as negative control for autofluorescence.

Microcarrier and MACSiBeads Cell Culture

Primary human T cells were obtained from cryopreserved peripheral blood mononuclear cells (PBMCs) (Zenbio) after separation with a negative selection magnetic activated cell sorting kit (Miltenyi Biotech). MACSibeads cell culture was performed according to the manufacturer's instructions (Miltenyi Biotek). Briefly, magnetic MACSibeads were conjugated with the provided anti-CD3 and anti-CD28 antibodies. Beads were added to the T cell cultures at a 1:2 bead:cell ratio, and initial cell density was 2.5e61/ml in 96 well plates with total volume of 300 ul. Microcarrier cultures were performed by adding 45 mg (approximately 36,000) microcarriers/well in 12 well plates and adding T cells in cell:bead ratios of 83, 25, or 10 with final media volume of 2 ml.

Cultures were allowed to expand for 14 days, after which they were assessed for fold change and phenotype via flow cytometry and chemotaxis assay. Fold change was quantified is using a Countess automatic cell counter (Thermo Fisher). Media was added after day 3 every 1-2 days based on media color. In all cases, recombinant human IL2 (Peprotech) was added to media at 400 U/ml. Media in all eases was either RPMI-1640 (Thermo Fisher)+10% FBS (Hyclone) or OpTmizer with T cell expansion supplement (Thermo Fisher).

Viral Transduction

T cells were transduced using RetroNectin (Thermo Fisher) following the plate-coating protocol provided by the manufacturer. Briefly, 50 µl of 50 µg/ml working solution of Rectronectin was added to a non-IC-treated 96 well plate. The plate was sealed and incubated overnight at 4° C. The plate was then washed and blocked with 2% BSA solution. After BSA was aspirated, plate was stored at 4° C. until future use.

For plate-bound antibody T cell cultures, the plate was prepared by adding a working solution of anti-CD3 and anti-CD28 low endotoxin, azide free (LEAF) antibodies (Biolegend) at 1 µg/ml and 2 ug/ml respectively to a non-TC-treated 96 well plate. Plate was incubated overnight at 4° C. and washed twice with PBS prior to culture. T cells were added to each well at 2.5e6 cell/ml with 300 µl total media per well (OpTmizer, Thermo Fisher). Microcarrier cultures were carried out as described.

Cells were transduced on day 1 of culture using a VSV-G pseudotyped lentivirus with the αCD19-41BB-CD3ζ (30) chimeric: antigen receptor as the genetic payload (Emory Viral Vector Core). In retronectin plates, each coated well was filled with 50 ul media and appropriate amount of virus to achieve an MOI of 5 or 15 based on starting cell number. Wells were mixed well using a micropipette to ensure even coating and centrifuged for 2 hours at 32° C. and 2000 g, Media was removed from retronectin wells, and T cells were transferred to the retronectin plate to begin transfection. In the ease of microcarrier samples, the microcarriers were resuspended well and transferred to the retronectin plate along with the cells. Transfection was allowed to proceed for 24 hours, after which cells were transferred again to a fresh plate where culture continued until day 14 with normal media additions. Each experimental group was performed in triplicate.

Flow Cytometry for Memory Cell Populations

Live cells were stained in flow buffer (PBS containing 0.5% BSA and 2 mM EDTA) at a density of 100,000 cells per 100 µL. Antibodies were added at a 1:20 dilution and incubated for 2 hours at 4 oC protected from light (anti-CD3-APC-H7, anti-CD4-PerCP-Cy5.5, anti-CD45RA-FITC, anti-CCR7-Alexa 647, anti-CD62L-PE, BD Biosciences). Cells were subsequently, washed in flow bugger and analyzed using a BD LSRFortessa. The data were analyzed using FlowJo software.

Chemotaxis

T cells were resuspended in RPMI medium (Life Technologies) containing 0.2% BSA (Sigma) at a density of 300,000 cells per 100 µL, and 100 µL of this cell suspension was added to the apical side of 24-well Transwell filters (Costar, 5 µm pore size). The chemokine CCL21 (PeproTech) was added to the basolateral chamber of the Transwells at a concentration of 0, 250, or 1000 ng/mL in RPMI+0.2% BSA. After loading, Transwells were placed at 37° C. , and the cells were allowed to migrate for 4 hours. Cells were then collected from the basolateral chamber and quantified via CountBright beads (Thermo Fisher) using an Accuri C6 flow cytometer. The data were analyzed using FlowJo software.

Quantification of CAR Expression Using Protein L

CAR expression was quantified as described previously (38). Briefly, at least 1e5 cells were transferred to flow tubes. Cells were washed three times with FACS buffer (PBS with 2% bovine serum albumin and 5 mM EDTA), Protein L (Thermo Fisher) at 1 mg/ml was added to each sample. Following incubation for 45 minutes, Protein L was washed out 3 three times with FACS buffer. In all samples 500 nerd streptavidin-PE conjugate was added and allowed to bind for 45 minutes. Cells were then washed again three times with FACS buffer. Cells were analyzed on a BD Accuri and events were quantified using FlowJo software. The positive gate was set at the boundary of an untransduce population.

Degranulation Assay

CD8+ T degranulation was assayed as previously described (6). Briefly, after 14 days of expansion, T cells from each group were pooled, and le5 were added to a V-bottom96 well plate in OpTmizer media with T cell expansion supplement. Each well received a stimulation cocktail of anti-CD49d (eBioscience), anti-CD28 (Biolegend) and monensin (Thermo Fisher) at concentrations of 1 µg/ml, 1 µg/ml, and 2 µM respectively. Positive control wells received an additional stimulation of 5 µg/ml anti-CD3 (Biolegend). Tumor cell wells received either wild-type K562 cells or CD19-transduced K562 cells (each at 1e5/well). Negative control wells received only media. The plate was centrifuged at 1.00 g for 1 minute and incubated for 4 hours at 37° C.

Data was analyzed via flow cytometry by staining for CD107a and CD4 and quantifying the CD107a4+ fraction of the CD4− population cells were distinguished from K562 cells via FSC/SSC. All data was quantified using Flogs Jo Software.

While several possible embodiments are disclosed above, embodiments of the present disclosure are not so limited. These exemplary embodiments arc not intended to be exhaustive or to unnecessarily limit the scope of the disclosure, but instead were chosen and described in order to explain the principles of the present disclosure so that others skilled in the art may practice the disclosure. Indeed, various modifications of the disclosure in addition to those described herein will become apparent to those skilled in the art from the foregoing description. Such modifications are intended to fall within the scope of the appended claims. The embodiments of the present invention are also not limited to the particular formulations, process steps, and materials disclosed herein as such formulations, process steps, and materials may vary somewhat. Further, the terminology employed herein is used for the purpose of describing exemplary embodiments only and the terminology is not intended to be limiting since the scope of the various embodiments of the present invention will be limited only by the appended claims and equivalents thereof.

All patents, applications, publications, test methods, literature, and other materials cited herein are hereby incorporated by reference in their entirety as if physically present in this specification.

REFERENCES

1. Kohn, D. B., et al. CARs on track in the clinic. Molecular therapy: the journal of the American Society of Gene Therapy 19, 432-438 (2011).
2. Rosenberg, S. A. & Restifo, N. P. Adoptive cell transfer as personalized immunotherapy for human cancer, Science 348, 62-68 (2015).
3. Maus, Grupp, S. A., Porter, D. L. & June, C. H. Antibody-modified T CARs take the front scat for hematologic malignancies. Blood 123, 2625-2635 (2014).
4. Davila, M. L., et al. Efficacy and toxicity management of 19-28z CAR T cell therapy in B cell acute lymphoblastic leukemia. Science translational medicine 6, 224ra225 (2014).
5. Maude, S .L., et al. Chimeric antigen receptor T cells for sustained remissions in leukemia. The New England journal of medicine 371, 1507-1517 (2014).
6. Kalos, M., et al. T cells with chimeric, antigen receptors have potent antitumor effects and can establish memory in patients with advanced leukemia. Science translational medicine 3, 95ra73 (2.011).
7. Xu, Y., et al. Closely related T-memory stem cells correlate with in viva expansion of CAR.CD19-T cells and are preserved by IL-7 and IL-15. Blood 123, 3750-3759 (2014).
8. Sari, S., Errachid, A., Schneider, Y. J. & Agathos, S. N. Controlled expansion and differentiation of mesenchymal stein cells in a microcarrier based stirred bioreactor. BMC proceedings 5 Suppl 8, P55 (2011).
9. Kim, B. J., Zhao, T., Young, L., Zhou, P. & Shuler, M. L. Batch, fed-batch, and microcarrier cultures with CHO cell lines in a pressure-cycle driven miniaturized bioreactor. Biotechnology and bioengineering 109, 137-145 (2012).
10. Kang, H., et al. Chondrogenic differentiation of human adiposederived stem cells using microcarrier and bioreactor combination technique. Molecular medicine reports 11, 1195-1199 (2015).
111. Lecina, M., Ting, S., Cboo, A., Reuveny, S. & Oh, S. Scalable platform for human embryonic stem cell differentiation to cardiomyocytes in suspended microcarrier cultures. Tissue engineering, Part C, Methods 16, 1609-1619 (2010).
12. Kehoe, D. E., Eng, D., Lock, L. T. & Tzanakakis, E. S. Scalable stirred-suspension bioreactor culture of human pluripotent stem cells. Tissue engineering. Part A 16, 405-421 (2010).
13. Fridley, K. M., Fernandez, I., Li, M. T., Kettlewell, R. B. & Roy, K. Unique differentiation prfile of mouse embryonic stem cells in rotary and stirred tank bioreactors. Tissue engineering, Part A 16, 3285-3298 (2010).
14. Bijonowski, Miller, W. M. & Wertheim, J. A. Bioreactor design for perfusion-based, highly-vascularized organ regeneration. Current opinion in chemical engineering 2, 32-40 (2013).
15. Groeber, F., Kahlig, A., Loff, S., Walles, H. & Hausmann, J. A bioreactor system for interfacial culture and physiological perfusion of vascularized tissue equivalents. Biotechnology journal 8, 308-316 (2013).
16. Kleinhans, C., et al. A perfusion bioreactor system efficiently generates cell-loaded bone substitute materials for addressing critical size bone defects. Biotechnology journal (2015).
17. Long, A. H., et al. 4-IBB costimulation ameliorates T cell exhaustion induced by tonic signaling of chimeric antigen receptors. Nature medicine (2015).
18. GE-Healthcare, Microcarrier Cell Culture Principles and Methods. GE Healthcare Life Sciences Handbook 18-1140-62, 8 (2015).
19. Jenkins, M. J. & Farid, S. S. Human pluripotent stem cell-derived products: advances towards robust, scalable and cost-effective manufacturing strategics. Biotechnology journal 10, 83-95 (2015).
20, Martin, Y. & Vermette, P. Bioreactors for tissue mass culture: design, characterization, and recent advances. Biomaterials 26, 7481-7503 (2005).
21. Marshall, L. E., et al. Flow-perfusion bioreactor system for engineered breast cancer surrogates to be used in preclinical testing. Journal of tissue engineering and regenerative medicine (2015),
22. Baumgartner, W., et al. Tissue mechanics of piled critical size biomimetic and biominerizable nanocomposites: Formation of bioreactor-induced stem cell gradients under perfusion and compression. Journal of the mechanical behavior of biomedical materials 47, 124-134 (2015).
23. Bartnikowski, M., Klein, T. J., Melchels, F. P. & Woodruff, M. A. Effects of scaffold architecture on mechanical characteristics and osteoblast response to static and perfusion bioreactor cultures. Biotechnology and bioengineering 111, 1440-1451 (2014).
24. Ceccarelli, G., et al. In vitro osteogenesis of human stein cells by wing a three-dimensional perfasion bioreactor culture system a review. Recent patents on drug delivery F formulation 7, 29-38 (2013).
25. Chary, S. R. & Jain, R. K. Direct easurementof interstitial convection and diffusion of albumin in normal and neoplastic tissues by fluorescence photobleaching. Proceedings of the National Academy of Sciences of the United States of America 86, 5385-5389 (1989).
26. Sakuishi, K., et al, Targeting Tim-3 and PD-1 pathways to reverse T cell exhaustion and restore anti-tumor immunity. The Journal of experimental medicine 207, 2187-2194 (2010).
27. Woo, S. R., et al. Immune inhibitory molecules LAG-3 and PD-1 synergistically regulate T-cell function to promote tumoral immune escape. Cancer research 72, 917-927 (2012).
28. Baitsch, L., et al. Exhaustion of tumor-specific CD8 (+) T cells in metastases from melanoma patients. The journal of clinical investigation 121, 2350-2360 (2011).
29, Ahmadzada, M., et al. Tumor antigen-specific CD8 T cells infiltrating the tumor express high levels of PD-1 and are functionally impaired. Blood 114, 1537-1544 (2009).
30. Milone, M. C., et al. Chimeric receptors containing CD137 signal transduction domains mediate enhanced survival of T cells and increased antileukemic efficacy in vivo. Molecular therapy: the journal of the American Society of Gene Therapy 17, 1453-1464 (2009).
31. Wang, X., et al, Phenotypic and functional attributes of lentivirus-modified CD19-specific human CD8+ central memory T cells manufactured at clinical scale. Journal of immunotherapy 35, 689-701 (2012).

32. Wang, X., et al. Engraftment of human central memory-derived effector CD8+ T cells in to immunodeficient mice. Blood 117, 1888-1898 (2011).

33. Berger, C., et al. Adoptive transfer of effector CD8+ T cells derived from central memory cells establishes persistent T cell memory in primates. The Journal of clinical investigation 118, 294-305 (2008).

34. Virgin, H. W., Wherry, E. Amed, R. Redefining chronic viral infection, Cell 138, 30-50 (2009).

35. Wherry, T cell exhaustion. Nature immunology 12, 492-499 (2011).

36. Doedens, A. L., et al. 1-lypoxia-inducible factors enhance the effector responses of CD8(+) T cells to persistent antigen. Nature immunology 14, 1173-1182 (2013).

37. Pearce, et al, Enhancing CD8 T-cell memory by modulating fatty acid metabolism. Nature 460, 103-107 (2009).

38. Meng, Z., Chinnasamy, N., & Morgan, R. A. (2012). Protein L: a novel reagent for the detection of chimeric antigen receptor (CAR) expression by flow cytometry. Journal of Translational Medicine, 10(1), 29. http://doi.org/10.118671479-5876-10-29

What is claimed is:

1. A method of expanding, activating, and/or transfecting suspension cells, the method comprising:
   obtaining a blood sample from a patient;
   isolating suspension cells from the blood sample;
   introducing the suspension cells to a bioreactor comprising a suspended macroporous microcarrier;
   activating the suspension cells;
   expanding the suspension cells;
   optionally transfecting the suspension cells;
   preparing the suspension cells for transfusion into the patient; and
   transfusing the suspension cells into the patient;
   wherein the macroporous microcarrier comprises gelatin or other extracellular matrix components and is functionalized with antibodies that are specific for activation of the suspension cells; and
   wherein the suspension cells are T cells.

2. The method of claim 1, wherein the blood or tissue sample is obtained by leukapharesis.

3. The method of claim 1, wherein the step of isolating suspension cells from the blood sample further comprises bead separation or magnetic bead separation.

4. The method of claim 1, wherein the bioreactor comprises a closed bioreactor or an open bioreactor.

5. The method of claim 4, wherein the closed bioreactor comprises a stirred-type bioreactor, a bag bioreactor, or a perfusion.

6. The method of claim 1, wherein the macroporous microcarrier is three dimensional.

7. The method of claim 1, wherein the macroporous microcarrier comprises proteins, carbohydrates, lipids or nucleic acids.

8. The method of claim 1, wherein the macroporous microcarrier is functionalized after it is made with gelatin or other extracellular matrix components.

9. The method of claim 1, wherein the macroporous microcarrier further comprises aptamers and/or phage-display identified peptide ligands.

10. The method of claim 1, wherein the antibodies comprise anti-CD2, anti-CD3 and/or anti-CD28 antibodies.

11. The method of claim 1, further comprising a culture medium, at least one cytokine, and/or at least one viral vector.

12. The method of claim 11, wherein the at least one cytokine comprises IL2, and optionally at least one of IL7 or IL15.

13. The method of claim 1, wherein the activation step further comprises agitation, optionally under hypoxic conditions.

14. The method of claim 1, wherein the expansion step further comprises seed trains, optionally under hypoxic conditions.

15. The method of claim 1, wherein the optional transfection step further comprises adding at least one viral vector to the bioreactor comprising the suspension cells.

16. The method of claim 1, wherein the suspension cells comprise recombinant T cells, gene modified T cells, chimeric antigen receptor (CAR) T cells, unmodified T cells, and/or $CCR7^+CD62^+$central memory T cells.

17. The method of claim 11, wherein the at least one viral vector is configured for use in gene therapy.

18. The method of claim 17, wherein the at least one viral vector comprises a CAR transgene and optionally at least one additional gene, wherein the at least one additional gene comprises therapeutic genes, surface marker genes, reporter genes, suicide genes, chemokine receptor genes, cytokine-expressing genes, and/or immune-checkpoint receptor genes.

19. The method of claim 1, wherein the preparation step further comprises cell expansion and downstream bioprocessing.

20. The method of claim 19, wherein the cell expansion and downstream bioprocessing comprises cell separation, purification, packaging, preservation, storage, shipping and transport, thawing, formulation, resuspension, and transfusion.

21. The method of claim 1, wherein the transfusion step further comprises injection, intravenous administration, or implantation.

* * * * *